(12) United States Patent
Po et al.

(10) Patent No.: US 7,340,136 B2
(45) Date of Patent: Mar. 4, 2008

(54) MULTI-WAVELENGTH OPTICAL FIBER

(75) Inventors: Hong Po, Sherborn, MA (US); Andrey A. Demidov, Duxbury, MA (US)

(73) Assignee: OCG Technology Licensing, LLC, Columbia, MD (US)

( * ) Notice: Subject to any disclaimer, the term of this patent is extended or adjusted under 35 U.S.C. 154(b) by 0 days.

(21) Appl. No.: 10/735,862

(22) Filed: Dec. 12, 2003

(65) Prior Publication Data

US 2004/0179797 A1 Sep. 16, 2004

Related U.S. Application Data

(63) Continuation of application No. PCT/US02/20817, filed on Jul. 1, 2002.

(60) Provisional application No. 60/302,603, filed on Jul. 2, 2001.

(51) Int. Cl.
*G02B 6/00* (2006.01)
(52) U.S. Cl. .................................... 385/123; 385/31
(58) Field of Classification Search ................ 385/123; 372/3, 6
See application file for complete search history.

(56) References Cited

U.S. PATENT DOCUMENTS

| | | | |
|---|---|---|---|
| 4,063,106 A | 12/1977 | Ashkin et al. | |
| 4,616,898 A | 10/1986 | Hicks, Jr. | |
| 4,699,452 A | 10/1987 | Mollenauer et al. | |
| 4,794,598 A | 12/1988 | Desurvire et al. | |
| 4,881,790 A | 11/1989 | Mollenauer | |
| 5,225,925 A | 7/1993 | Grubb et al. | |
| 5,323,404 A * | 6/1994 | Grubb | 372/6 |
| 5,406,411 A | 4/1995 | Button et al. | |
| 5,659,644 A | 8/1997 | DiGiovanni et al. | |
| 5,673,280 A | 9/1997 | Grubb et al. | |
| 5,721,636 A | 2/1998 | Erdogan et al. | |
| 5,778,014 A | 7/1998 | Islam | |
| 5,815,518 A * | 9/1998 | Reed et al. | 372/6 |
| 5,838,700 A | 11/1998 | Dianov et al. | |
| 5,959,750 A | 9/1999 | Eskildsen et al. | |
| 5,966,480 A | 10/1999 | LeGrange et al. | |
| 5,982,791 A * | 11/1999 | Sorin et al. | 372/25 |

(Continued)

FOREIGN PATENT DOCUMENTS

CA     2282943 A1 * 3/2000

(Continued)

OTHER PUBLICATIONS

Chang et al.; "Cascaded Raman fibre laser for stable dual-wavelength operation"; Electronics Letters Jun. 7, 2001, vol. 37, No. 12, p. 740-741.

(Continued)

*Primary Examiner*—Sung Pak
(74) *Attorney, Agent, or Firm*—Peter J. Rainville

(57) ABSTRACT

The invention features a fiber that includes an optical fiber (110) containing a gain medium having a Raman active material with a Raman gain spectrum. The optical fiber is configured to receive energy at a wavelength $\lambda_p$. The fiber also includes at least three pairs of reflectors (120, 125, 150, 130, 160) disposed in the optical fiber. Each pair of reflectors forms a resonance cavity (140) with a resonance frequency.

92 Claims, 12 Drawing Sheets

U.S. PATENT DOCUMENTS

| | | | |
|---|---|---|---|
| 6,052,393 | A | 4/2000 | Islam |
| 6,081,366 | A | 6/2000 | Kidorf et al. |
| 6,088,152 | A | 7/2000 | Berger et al. |
| 6,147,794 | A | 11/2000 | Stentz |
| 6,151,160 | A | 11/2000 | Ma et al. |
| 6,163,396 | A | 12/2000 | Webb |
| 6,163,552 | A * | 12/2000 | Engelberth et al. ............ 372/3 |
| 6,163,554 | A | 12/2000 | Chang et al. |
| 6,163,636 | A | 12/2000 | Stentz et al. |
| 6,181,464 | B1 | 1/2001 | Kidorf et al. |
| 6,191,877 | B1 | 2/2001 | Chraplyvy et al. |
| 6,292,288 | B1 | 9/2001 | Akasaka et al. |
| 6,310,899 | B1 * | 10/2001 | Jacobovitz-Veselka et al. 372/6 |
| 6,344,925 | B1 | 2/2002 | Grubb et al. |
| 6,374,006 | B1 | 4/2002 | Islam et al. |
| 6,407,855 | B1 * | 6/2002 | MacCormack et al. ..... 359/346 |
| 6,426,965 | B1 | 7/2002 | Chang et al. |
| 6,433,920 | B1 | 8/2002 | Welch et al. |
| 6,549,329 | B2 | 4/2003 | Vail et al. |
| 6,594,288 | B1 | 7/2003 | Putnam et al. |
| 6,603,593 | B2 | 8/2003 | Fidric et al. |
| 6,603,595 | B2 | 8/2003 | Welch et al. |
| 6,606,337 | B1 | 8/2003 | King |
| 6,621,835 | B1 | 9/2003 | Fidric |
| 6,700,696 | B2 | 3/2004 | Dominic et al. |
| 2001/0010696 | A1 * | 8/2001 | Bufetov et al. ................. 372/3 |
| 2002/0001125 | A1 | 1/2002 | Chang et al. |
| 2002/0024722 | A1 | 2/2002 | Tsuzaki et al. |
| 2002/0126714 | A1 | 9/2002 | Po et al. |
| 2002/0191277 | A1 | 12/2002 | Chen et al. |
| 2003/0021302 | A1 | 1/2003 | Grudinin et al. |
| 2003/0076577 | A1 | 4/2003 | Dominic et al. |
| 2004/0156588 | A1 | 8/2004 | Demidov et al. |
| 2005/0078715 | A1 * | 4/2005 | Borne et al. .................... 372/3 |
| 2005/0100280 | A1 * | 5/2005 | Ramachandran ............. 385/37 |

FOREIGN PATENT DOCUMENTS

| | | |
|---|---|---|
| EP | 0 954 072 A1 | 11/1999 |
| EP | 0 954 072 B1 | 4/2000 |
| EP | 1 018 666 A1 | 7/2000 |
| EP | 1 124 295 A2 | 8/2001 |
| EP | 1124295 A2 * | 8/2001 |
| EP | 1 225 666 A2 | 7/2002 |
| EP | 1 257 023 A2 | 11/2002 |
| EP | 1 309 113 A2 | 5/2003 |
| EP | 1349242 A1 * | 10/2003 |
| JP | 58121694 | 7/1983 |
| JP | 59165488 | 9/1984 |
| JP | 63202085 | 8/1988 |
| JP | 1196189 | 8/1989 |
| WO | WO 96/37936 | 11/1996 |
| WO | WO 99/50941 | 10/1999 |
| WO | WO 01/33285 A2 | 5/2001 |
| WO | WO 01/33285 A3 | 5/2001 |
| WO | WO 02/063728 A2 | 8/2002 |
| WO | WO 02/063728 A3 | 8/2002 |
| WO | WO 02/093704 A1 | 11/2002 |
| WO | WO 03/014771 A2 | 2/2003 |
| WO | WO 03/014771 A3 | 2/2003 |
| WO | WO 03/005068 A3 | 4/2003 |

OTHER PUBLICATIONS

Chang et al.; "Dual-wavelength cascaded Raman fibre laser"; Electronics Letters Aug. 3, 2000, vol. 36, No. 16, p. 1356-1358.

Chang et al.; "Cascaded Raman fibre laser operating at 1.48um"; Electronics Letters Oct. 28, 1999, vol. 35, No. 22, p. 1951-1952.

Chernikov et al.; "Raman fibre laser operating at 1.24um"; Electronics Letters Apr. 2, 1998, vol. 34, No. 7, p. 680-681.

Persephonis et al.; "Cascaded CW fibre Raman laser source 1.6-1.9um"; Electronics Letters Aug. 1, 1996, vol. 32, No. 16, p. 1486-1487.

Chernikov et al.; "High-gain, monolithic, cascaded fibre Raman amplifier operating at 1.3um"; Electronics Letters Mar. 16, 1995, vol. 31, No. 6, p. 472-473.

Stentz et al.; "Figure-eight fibre laser with largely unbalanced central coupler"; Electronics Letters Aug. 4, 1994, vol. 30, No. 16, p. 1302-1303.

Demidov et al.; "Three-wavelength Raman fiber laser with reliable dynamic control"; Optics Letters, vol. 28, No. 17, Sep. 1, 2003, p. 1540-1542.

Dianov et al.; "Three-cascaded 1407-nm Raman laser based on phosphorus-doped silica fiber"; Optics Letters, vol. 25, No. 6, Mar. 15, 2000, p. 402-404.

Stentz et al.; "Polarization effects and nonlinear switching in fiber figure-eight lasers"; Optics Letters, vol. 19, No. 18, Sep. 15, 1994, p. 1462-1464.

Lewis et al.; "Fibre-optic tunable CW Raman laser operating around 1.3um"; Optics Communications 182 (2000) 403-405.

Prabhu et al.; "Simultaneous two-color CW Raman fiber laser with maximum output power of 1.05W / 1239nm and 0.95W / 1484 nm etc."; Optics Communications 182 (2000) 305-309.

Chang et al.; "Efficient cascaded Raman generation and signal amplification at 1.3um in GeO2-doped single-mode fibre"; Optics Communications 142 (1997) 289-293.

Xu et al.; "Output characteristics of a fibre Raman laser with a composite GeO2 and P2O5-doped silica fibre"; Journal of Modern Optics, 2001, vol. 48, No. 7, 1269-1279.

Kidorf et al.; "Pump Interactions in a 100-nm Bandwidth Raman Amplifier"; IEEE Photonics Technology Letters, vol. 11, No. 5, May 1999, p. 530-532.

Jain et al.; "A tunable multiple Stokes cw fiber Raman oscillator"; Applied Physics Letters, vol. 31, No. 2, Jul. 15, 1977, p. 89-90.

Hill et al.; "Low-threshold cw Raman laser"; Applied Physics Letters, vol. 29, No. 3, Aug. 1, 1976, p. 181-183.

Chang et al.; "A novel intra-cavity for efficient cascaded Raman generation using WDM couplers"; OFC 2001, Anaheim; WDD14-1.

Papernyi et al.; "Efficient dual-wavelength Raman fiber laser"; OFC 2001, Technical Digest, WDD15-1.

Mermelstein et al.; "A High-Efficiency Power-Stable Three-Wavelength Configurable Raman Fiber Laser"; OFC 2001, Anaheim, Post Deadline, PD3-1.

Chernikov et al.; "Broadband Raman amplifiers in the spectral range of 1480-1620 nm"; OFC 1999, WG6-1/117.

Demidov et al.; "Optical Fiber Amplifier"; U.S. Appl. No. 10/771,002, filed Feb. 3, 2004.

* cited by examiner

MULTI-WAVELENGTH OPTICAL FIBER

CROSS-REFERENCE TO RELATED APPLICATIONS

This application is a continuation of International Application No. PCT/US02/20817, which has an international filing date of Jul. 1, 2002, and is entitled "Multi-Wavelength Optical Fiber", and which in turn claims priority to U.S. Provisional Patent Application Ser. No. 60/302,603, which was filed Jul. 2, 2001 and is also entitled "Multi-Wavelength Optical Fiber". The foregoing applications are incorporated herein by reference.

TECHNICAL FIELD

This invention relates to optical fibers (e.g., fiber lasers and fiber amplifiers), and systems containing such optical fibers.

BACKGROUND

Certain optical fibers can be used as fiber amplifiers or fiber lasers.

Fiber amplifiers are typically used to amplify an input signal. Often, the input signal and a pump signal are combined and passed through the fiber amplifier to amplify the signal at the input wavelength. The amplified signal at the input wavelength can then be isolated from the signal at undesired wavelengths.

Raman fiber lasers can be used, for example, as energy sources. In general, Raman fiber lasers include a pump source coupled to a fiber, such as an optical fiber, having a gain medium with a Raman active material. Energy emitted from the pump source at a certain wavelength $\lambda_p$, commonly referred to as the pump energy, is coupled into the fiber. As the pump energy interacts with the Raman active material in the gain medium of the fiber, one or more Raman Stokes transitions can occur within the fiber, resulting in the formation of energy within the fiber at wavelengths corresponding to the Raman Stokes shifts that occur (e.g., $\lambda_{s1}$, $\lambda_{s2}$, $\lambda_{s3}$, $\lambda_{s4}$, etc.).

Generally, the Raman active material in the gain medium of a Raman fiber laser may have a broad Raman gain spectrum. Usually, conversion efficiency varies for different frequencies within the Raman gain spectrum and many Raman active materials exhibit a peak in their gain spectrum, corresponding to the frequency with highest conversion efficiency. Additionally, the gain spectrum for different Raman active materials may be substantially different, partially overlapping, or of different conversion efficiency.

Typically, a Raman fiber laser is designed so that the energy formed at one or more Raman Stokes shifts is substantially confined within the fiber. This can enhance the formation of energy within the fiber at one or more higher order Raman Stokes shifts. Often, the fiber is also designed so that at least a portion of the energy at wavelengths corresponding to predetermined, higher order Raman Stokes shifts (e.g., $\lambda_{sx}$ where x is equal to or greater than one) is allowed to exit the fiber.

SUMMARY

In general, the invention relates to optical fibers (e.g., fiber lasers and fiber amplifiers), and systems containing such optical fibers.

In one aspect, the invention features a fiber that includes an optical fiber containing a gain medium having a Raman active material with a Raman gain spectrum. The optical fiber is configured to receive energy at a wavelength $\lambda_p$. The fiber also includes at least three pairs of reflectors disposed in the optical fiber. Each pair of reflectors forms a resonance cavity with a resonance frequency. Each resonance cavity has an index, and the index of each resonance cavity is different than the index of the other resonance cavities. For a resonance cavity having an index with a value M (M is an integer having a value of at least one), the resonance cavity has a resonance frequency $(c/\lambda_{sm})$, where $\lambda_{sm}^{-1} = \lambda_p^{-1} - \Sigma_M \lambda_{rm}^{-1}$, where $(c/\lambda_{rm})$ is a frequency within the Raman gain spectrum of the Raman active material contained in the gain medium, and c is the speed of light. For a resonance cavity having an index with a value N, the resonance cavity has a resonance frequency $(c/\lambda_{sn})$. The resonance cavity having the index value N overlaps only with a resonance cavity having a resonance frequency $(c/\lambda_{s(n-1)})$ and with a resonance cavity having a resonance frequency $(c/\lambda_{s(n+1)})$ (N is an integer having a value of at least two). In the case where N corresponds to the highest index number (i.e., the cavity with the lowest resonance frequency), the cavity overlaps only with a resonance cavity having a resonance frequency $(c/\lambda_{s(n-1)})$.

For example, $\lambda_{s1}^{-1} = \lambda_p^{-1} - \lambda_{r1}^{-1}$, where $\lambda_{r1}^{-1}$ is a frequency in the Raman gain spectrum of the active material. As another example, $\lambda_{s2}^{-1} = \lambda_p^{-1} - \lambda_{r1}^{-1} - \lambda_{r2}^{-1}$, where $\lambda_{r2}^{-1}$ is a frequency in the Raman gain spectrum of the active material. As a further example, $\lambda_{s3}^{-1} = \lambda_p^{-1} - \lambda_{r1}^{-1} - \lambda_{r2}^{-1} - \lambda_{r3}^{-1}$, where $\lambda_{r3}^{-1}$ is a frequency in the Raman gain spectrum of the active material. $\lambda_{r1}$, $\lambda_{r2}$ and/or $\lambda_{r3}$ can be the same or different.

The optical fiber can include, for example, three, four, five, six, seven, eight, nine, 10 or more than 10 pairs of reflectors.

In some embodiments, at least one pair of reflectors has a first reflector and a second reflector. The first reflector is disposed in the optical fiber closer to a point where energy at the wavelength $\lambda_p$ enters the optical fiber than the second reflector, and the second reflector is configured to reflect only a portion of energy impinging thereon at the resonance frequency for the resonance cavity formed by the at least one pair of reflectors. The first reflector can be configured to reflect substantially all energy impinging thereon at the resonance frequency for the resonance cavity formed by the at least one pair of reflectors. The second reflector can be configured to reflect less than about 98% (e.g., less than about 95%, less than about 90%, less than about 75%, less than about 60%, less than about 50%, less than about 25%, less than about 10%) of the energy impinging thereon at the resonance frequency for the resonance cavity formed by the at least one pair of reflectors. The amount of energy at the resonance frequency for the resonance cavity that the second reflector is capable of reflecting can be variable.

In certain embodiments, each pair of reflectors has a first reflector and a second reflector, and for each pair of reflectors: the first reflector is disposed in the optical fiber closer to a point where energy at the wavelength $\lambda_p$ enters the optical fiber than the second reflector and the second reflector is configured to reflect only a portion of energy impinging thereon at the resonance frequency for the resonance cavity formed by the first and second reflectors.

At least one resonance cavity in the optical fiber can have a suppressor disposed therein. The suppressor can be configured to substantially suppress formation of energy at a frequency $(c/\lambda_x)$ where $\lambda_x^{-1} = \lambda_z^{-1} - \lambda_a^{-1}$, and $(c/\lambda_z)$ is the resonance frequency of the resonance cavity and $(c/\lambda_a)$ is a frequency in the Raman gain spectrum of the active material in the gain medium of the fiber. The suppressor can be, for example, formed of one or more long period gratings.

One pair of reflectors can have first and second reflectors, and the first and second reflectors can be configured to reflect substantially all energy impinging thereon at the resonance frequency of the corresponding resonance cavity.

In some embodiments, the at least three pairs of reflectors includes a first pair of reflectors and a second pair of reflectors. The first pair of reflectors has first and second reflectors, and the second pair of reflectors has first and second reflectors. The first and second reflectors of the first pair of reflectors are configured to reflect substantially all energy impinging thereon at the resonance frequency of the resonance cavity formed by first pair of reflectors, and the first and second reflectors of the second pair of reflectors are configured to reflect substantially all energy impinging thereon at the resonance frequency of the resonance cavity formed by the second pair of reflectors.

In certain embodiments, the at least three pairs of reflectors includes a first pair of reflectors, a second pair of reflectors and a third pair of reflectors. The first pair of reflectors has first and second reflectors, the second pair of reflectors has first and second reflectors, and the third pair of reflectors has first and second reflectors. The first and second reflectors of the first pair of reflectors are configured to reflect substantially all energy impinging thereon at the resonance frequency of the resonance cavity formed by the first pair of reflectors, the first and second reflectors of the second pair of reflectors are configured to reflect substantially all energy impinging thereon at the resonance frequency of the resonance cavity formed by the second pair of reflectors, and the first and second reflectors of the third pair of reflectors are configured to reflect substantially all energy impinging thereon at the resonance frequency of the resonance cavity formed by the third pair of reflectors.

The fiber can further include an additional reflector disposed in the optical fiber. The additional reflector can be configured to at least partially reflect energy impinging thereon (e.g., reflect substantially all energy impinging thereon) at the wavelength $\lambda_p$.

One or more of the pairs of reflectors can be formed of a pair of fiber Bragg gratings.

The Raman active material(s) can be, for example, $GeO_2$, $P_2O_5$, $SiO_2$, $B_2O_3$ or $SiO_xF_y$.

In another aspect, the fiber can be used in a fiber laser system that also includes an energy source configured to emit energy at a wavelength $\lambda_p$.

In a further aspect, the invention features a fiber that includes an optical fiber containing a gain medium having a Raman active material. The optical fiber is configured to receive energy at a wavelength $\lambda_p$. The fiber also includes at least three pairs of reflectors disposed in the optical fiber. Each pair of reflectors forms a corresponding resonance cavity with a corresponding resonance frequency. The resonance frequency of each resonance cavity is different than the resonance frequency of any other cavity. The optical fiber is substantially devoid of a portion containing more than two of the resonance cavities. The fiber can be incorporated in a system containing an energy source capable of emitting energy at the wavelength $\lambda_p$.

In one aspect, the invention features a fiber that includes an optical fiber containing a plurality of sections including a first section having a gain medium including a first Raman active material and a second section having a gain medium including a second Raman active material. The second Raman active material can be the same as or different than the first Raman active material. Alternatively, the concentration of the Raman active material in the second section can be the same as or different than the concentration of the Raman active material in the first section of fiber. Or, the diameter of the fiber core of the second section of fiber can be the same as or different than the diameter of the fiber core of the first section of fiber. The optical fiber is configured to receive energy at a wavelength $\lambda_p$. At least three pairs of reflectors are disposed in the optical fiber. Each pair of reflectors forms a corresponding resonance cavity with a corresponding resonance frequency. The optical fiber is substantially devoid of a portion containing more than two of the resonance cavities. The fiber can be incorporated in a system that includes an energy source configured to emit energy at a wavelength $\lambda_p$.

In another aspect, the invention features a fiber that includes an optical fiber having a gain medium having a Raman active material. The optical fiber is configured to receive energy at a wavelength $\lambda_p$. The fiber also includes a plurality of reflectors disposed in the optical fiber. At least some of the plurality of reflectors form resonance cavities in the optical fiber. Each resonance cavity has a resonance frequency. The resonance frequency of each resonance cavity can be different than the resonance frequency of any other cavity. The plurality of reflectors are configured so that when the optical fiber receives energy at the wavelength $\lambda_p$, the ratio of the output power at a desired wavelength to the pump power can be at least 20% (e.g., at least 30%, at least 40%, at least 50%, at least 60%, at least 70%, at least 80%, at least 90%, at least 95%, at least 98%) of the theoretical limit.

In a further aspect, the invention features a fiber that includes an optical fiber having a gain medium having a Raman active material. The optical fiber is configured to receive energy at a wavelength $\lambda_p$. The fiber also includes a plurality of reflectors disposed in the optical fiber. At least some of the plurality of reflectors form resonance cavities in the optical fiber. Each resonance cavity has a resonance frequency. The resonance frequency of each resonance cavity can be different than the resonance frequency of any other cavity. The plurality of reflectors are configured so that when the optical fiber receives energy at the wavelength $\lambda_p$, the ratio of the total output power at one or more desired wavelengths to the pump power can be at least 20% (e.g., at least 30%, at least 40%, at least 50%, at least 60%, at least 70%, at least 80%, at least 90%, at least 95%, at least 98%) of the theoretical limit.

In one aspect, the invention features a system that includes a fiber having the structure described herein. The system also includes a splitter configured so that output energy from the fiber can be coupled into the splitter. The system further includes a plurality of optical fibers (e.g., at least five fibers, at least 25 fibers, at least 50 fibers, at least 75 fibers, at least 100 fibers, at least 250 fibers, at least 500 fibers) configured so that energy output from the splitter can be coupled into one or more of the plurality of fibers.

In another aspect, the invention features a system that includes a pump laser and a fiber laser coupled to the pump laser so that energy output by the pump laser can be coupled into the fiber laser. The system also includes a fiber as described herein. The fiber is coupled to the fiber laser so that energy output by the fiber laser can be coupled into the fiber. The system can further include an output cascade coupled to the fiber so that energy output by the fiber can be coupled into the output cascade.

In one aspect, the invention features a fiber that includes an optical fiber containing a gain medium having a Raman active material with a Raman gain spectrum. The optical fiber is configured to receive energy at a wavelength $\lambda_p$. The fiber also includes at least three pairs of reflectors disposed in the optical fiber. Each pair of reflectors forms a resonance cavity with a resonance frequency. Each resonance cavity has an index, and the index of each resonance cavity is different than the index of the other resonance cavities. For a resonance cavity having an index with a value M (M is an integer having a value of at least one), the resonance cavity has a resonance frequency $(c/\lambda_{sm})$, where $\lambda_{sm}^{-1} = \lambda_p^{-1} - \Sigma_M \lambda_{rm}^{-1}$, where $(c/\lambda_{rm})$ is a frequency within the Raman gain spectrum of the Raman active material contained in the gain medium, and c is the speed of light. For a resonance cavity having an index with a value N, the resonance cavity has a resonance frequency $(c/\lambda_{sn})$, and the reflectors are configured so that at least two resonance cavities do not overlap. In another aspect, the invention features a system including an energy source coupled to such a fiber.

In some embodiments, the invention can provide a Raman fiber laser having a relatively high output power at one or more desired wavelengths relative to the power of the pump laser that is received by the fiber (e.g., at the wavelength $\lambda_p$). For example, the ratio of the output power at one or more desired wavelengths to the pump power can be at least 20% (e.g., at least 30%, at least 40%, at least 50%, at least 60%, at least 70%, at least 80%, at least 90%, at least 95%, at least 98%) of the theoretical limit.

As used herein, the theoretical limit of the ratio of the output power at a desired wavelength $\lambda_x$ to the pump power $(\lambda_p)$ is the ratio of the wavelength of $\lambda_p$ to the wavelength of $\lambda_x$, when optical losses are neglected.

As used herein, the theoretical limit of the ratio of the total output power at one or more desired wavelengths (e.g., $\lambda_x$, $\lambda_y$, $\lambda_z$) to the pump power $\lambda_p$ is the sum of the individual ratios the wavelength of $\lambda_p$ to the desired wavelength(s) (e.g., $\lambda_p/\lambda_x$, $\lambda_p/\lambda_y$, $\lambda_p/\lambda_z$, respectively).

In some embodiments, the input power can be at least about 0.1 Watt (e.g., at least about 0.5 Watt, at least about one Watt, at least about 2 Watts, at least about 5 Watts, at least about 10 Watts).

In certain embodiments, the output power at a desired wavelength can be at least about 0.1 Watt (e.g., at least about 0.5 Watt, at least about one Watt, at least about 2 Watts, at least about 5 Watts, at least about 10 Watts).

In certain embodiments, the total output power at one or more desired wavelengths can be at least about 0.1 Watt (e.g., at least about 0.5 Watt, at least about one Watt, at least about 2 Watts, at least about 5 Watts, at least about 10 Watts).

In some embodiments, the output power at one or more undesired wavelengths can be relatively low (e.g., less than about one Watt, less than about 0.5 Watt, less than about 0.1 Watt, less than about 0.05 Watt).

In certain embodiments, it is a feature of the invention that $\lambda_p$ pumps only $\lambda_{s1}$.

In some embodiments, it is a feature of the invention that energy at a given Stokes shift frequency is pumped only by one other Stokes shift frequency.

In certain embodiments, the fibers can be used as amplifiers rather than lasers.

Features, objects and advantages of the invention are in the description, drawings and claims.

DESCRIPTION OF DRAWINGS

Like reference symbols in the various drawings indicate like elements.

DETAILED DESCRIPTION

Figure 1:
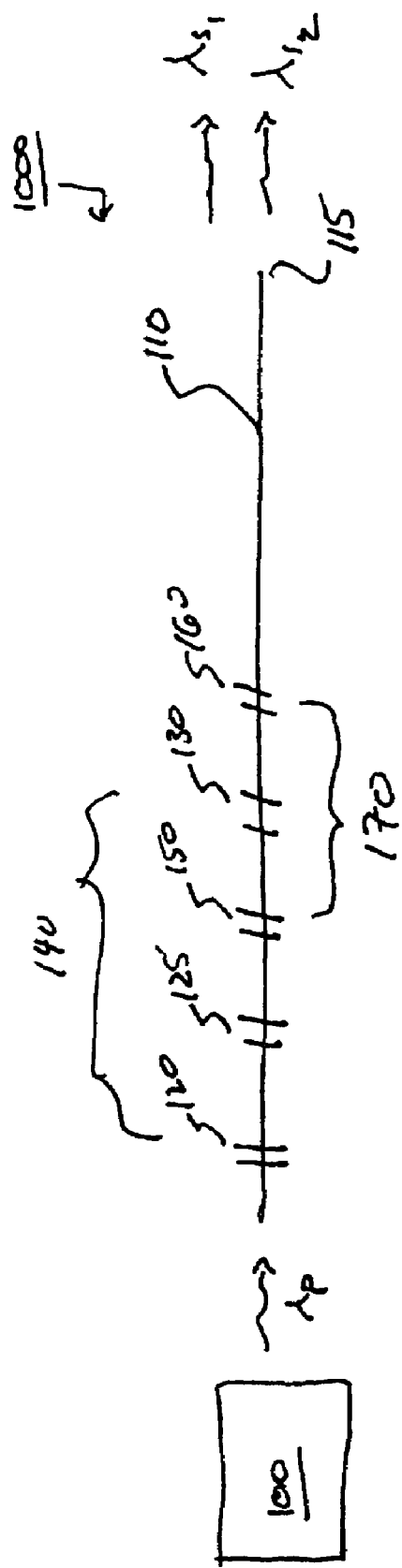
FIG. 1 is a schematic representation of an embodiment of a Raman fiber laser system.

FIG. 1 shows an embodiment of a Raman fiber laser system 1000 including a laser 100 and an optical fiber 110. Laser 100 is configured so that energy emitted by laser 100 at a wavelength $\lambda_p$ is coupled into optical fiber 110. Optical fiber 110 has a gain medium containing a Raman active material. Examples of Raman active materials include $GeO_2$, $P_2O_5$, $SiO_2$, $B_2O_3$, $SiO_xF_y$, and the like.

Optical fiber 110 includes a first pair of reflectors 120 and 130 (e.g., a pair of fiber Bragg gratings). Reflector 120 is configured to reflect substantially all (e.g., about 100%) energy impinging thereon at a wavelength $\lambda_{s1}$, where $\lambda_{s1}^{-1} = \lambda_p^{-1} - \lambda_{r1}^{-1}$, where $(c/\lambda_{r1})$ is a Raman Stokes shift frequency within the Raman gain spectrum of the Raman active material in the gain medium of fiber 110, and c is the speed of light. Reflector 130 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s1}$. Reflectors 120 and 130 form a resonance cavity 140 in fiber 110 for energy at wavelength $\lambda_{s1}$.

Optical fiber 110 also includes a reflector 125 that is configured to reflect substantially all (e.g., about 100%) energy impinging thereon at wavelength $\lambda_p$.

Optical fiber 110 further includes a second pair of reflectors 150 and 160 (e.g., a pair of fiber Bragg gratings). Reflector 150 is configured to reflect substantially all (e.g., about 100%) energy impinging thereon at a wavelength $\lambda_{s2}$, where $\lambda_{s2}^{-1} = \lambda_{s1}^{-1} - \lambda_{r2}^{-1}$, where $(c/\lambda_{r2})$ is a Raman Stokes shift frequency within the Raman gain spectrum of the Raman active material in the gain medium of fiber 110 ($\lambda_{r2}^{-1}$ may be the same as or different from $\lambda_{r1}^{-1}$). Reflector 160 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s2}$. Reflectors 150 and 160 form a resonance cavity 170 in fiber 110 for energy at wavelength $\lambda_{s2}$. In certain embodiments, reflector 125 is relatively close to reflector 150. In some embodiments, reflector 150 can be in cavity 170.

With this arrangement, as energy at $\lambda_p$ enters optical fiber 110, the energy at $\lambda_p$ propagates through fiber 110 and impinges upon reflector 125 where it is reflected and propagates in fiber 110 in the reverse direction. As energy at $\lambda_p$ propagates through fiber 110, it interacts with the Raman active material in the gain medium of fiber 110 to create energy at wavelength $\lambda_{s1}$. Energy at $\lambda_{s1}$ in cavity 140 that is propagating in the forward direction impinges upon reflector 130. A portion of the energy at $\lambda_{s1}$ that impinges on reflector 130 is reflected backward, and a portion of the energy at $\lambda_{s1}$ that impinges on reflector 130 continues to propagate through fiber 110 in the forward direction and exits fiber 110 (e.g., at an end 115 of fiber 110). The portion of energy at $\lambda_{s1}$ that is reflected by reflector 130 propagates through fiber 110 in the reverse direction until it reaches reflector 120 where it is reflected and then propagates through fiber 110 in the forward direction. Some of the energy at wavelength $\lambda_{s1}$ continues to propagate in fiber 110 in the forward and in reverse directions in resonance cavity 140, and some of the energy at wavelength $\lambda_{s1}$ exits resonance cavity 140 through reflector 130 and ultimately exits fiber 110 (e.g., at end 115).

As energy at wavelength $\lambda_{s1}$ propagates through fiber 110, it interacts with the Raman active material in the gain medium of fiber 110 to create energy at wavelength $\lambda_{s2}$. Energy at wavelength $\lambda_{s2}$ in cavity 170 that is propagating in the reverse direction is reflected by reflector 150 and then propagates through fiber 110 in the forward direction. Energy at wavelength $\lambda_{s2}$ propagating in cavity 170 in the forward direction impinges on reflector 160. Some of the energy at $\lambda_{s2}$ impinging on reflector 160 is reflected by reflector 160 and then propagates through cavity 170 in the reverse direction, and some of the energy at $\lambda_{s2}$ impinging on reflector 160 passes through reflector 160 and exits fiber 110 (e.g., at end 115). It is to be noted that, in this embodiment, $\lambda_p$ does not directly pump $\lambda_{s2}$.

Resonance cavities 110 and 140 are linked resonance cavities because, while a portion of these cavities overlaps, a portion of the cavities does not overlap.

Without wishing to be bound by theory, it is believed that this design can allow for enhanced control of the intensity of energy output by fiber 110 at wavelengths $\lambda_{s1}$ and $\lambda_{s2}$ by controlling (e.g., independently controlling) the transmission of reflectors 130 and/or 160, and/or the intensity of the pump energy. For the case where reflector 130 is positioned close to reflector 160 (i.e., $z_{125} \approx z_{150}$ and $z_{130} \approx z_{160}$, where $z_x$ is to the position of reflector x), it is believed that the performance of fiber 110 can be explained, at least in part, using the following system of equations.

$$\left. \begin{array}{l} \dfrac{dI_p^+}{dz} = -g_p(I_{s1}^+ + I_{s1}^-) \times I_p^+ - \alpha_p I_p^+ = -\dfrac{dI_p^-}{dz} \\ \dfrac{dI_{\lambda_{s1}}^+}{dz} = g_1 I_{\lambda_{s1}}^+ \times (I_p^+ + I_p^-) - \alpha_1 I_{\lambda_{s1}}^+ = -\dfrac{dI_{\lambda_{s1}}^-}{dz} \end{array} \right\} \cdots \text{along cavity 140}$$

-continued $$\left. \begin{array}{l} \dfrac{dI_{\lambda_{s1}}^+}{dz} = -\tilde{g}_1 I_{\lambda_{s1}}^+ \times (I_{\lambda_{s2}}^+ + I_{s1}^-) - \alpha_1 I_{\lambda_{s1}}^+ = -\dfrac{dI_{\lambda_{s1}}^-}{dz} \\ \dfrac{dI_{\lambda_{s2}}^+}{dz} = g_2 I_{\lambda_{s2}}^+ \times (I_{\lambda_{s1}}^+ + I_{s1}^-) - \alpha_2 I_{\lambda_{s2}}^+ = -\dfrac{dI_{\lambda_{s2}}^-}{dz} \end{array} \right\} \cdots \text{along cavity 170}$$

with the boundary conditions:

$I_p^+(z=0)=I_0$;

$I_p^-(z=z_{125})=R_p \times I_p^+(z=z_{125})$;

$I_{\lambda_{s1}}^+(z=z_{120})=R_{\lambda_{s1}}^{120} \times I_{\lambda_{s1}}^-(z=z_{120})$, $I_{\lambda_{s1}}^-(z=z_{130}) = R_{\lambda_{s1}}^{130} \times I_{\lambda_{s1}}^+(z=z_{130})$;

$I_{\lambda_{s2}}^+(z=z_{150})=R_{\lambda_{s2}}^{150} \times I_{\lambda_{s2}}^-(z=z_{150})$, $I_{\lambda_{s2}}^-(z=z_{160}) = R_{\lambda_{s2}}^{160} \times I_{\lambda_{s2}}^+(z=z_{160})$;

The indices $^+$ and $^-$ represent propagation in fiber 110 from left to right and from right to left, respectively. $I_p$, $I_{\lambda_{s1}}$, and $I_{\lambda_{s2}}$ represent the intensities of energy propagating in fiber 110 at wavelengths $\lambda_p$, $\lambda_{s1}$ and $\lambda_{s2}$, respectively. $\alpha_p$, $\alpha_{s1}$ and $\alpha_{s2}$ are the loss coefficients of energy propagating in fiber 110 at wavelengths $\lambda_p$, $\lambda_{s1}$ and $\lambda_{s2}$, respectively, due to, for example, imperfections, scattering and/or splicing in fiber 110. $g_p$, $g_1$, $\tilde{g}_1$ and $g_2$ are the Raman gain coefficients, respectively, of energy propagating in fiber 110 at wavelengths $\lambda_p$, $\lambda_{s1}$ and $\lambda_{s2}$, respectively, due to stimulated Raman scattering (SRS). It is to be noted that $g_1$ and $\tilde{g}_1$ represent gain coefficients for energy at $\lambda_{s1}$ which can correspond to the same or different portion(s) of the Raman gain spectrum of the Raman active material in the gain medium of fiber 110. $g_1$ corresponds to SRS energy transfer from $\lambda_p$ to $\lambda_{s1}$ and $\tilde{g}_1$ corresponds to SRS energy transfer from $\lambda_{s1}$ to $\lambda_{s2}$, with respect to $\lambda_{s1}$. $g_2$ is the Raman gain coefficient for the transfer of energy from $\lambda_{s1}$ to $\lambda_{s2}$, with respect to $\lambda_{s2}$, and is defined by $g_2=(\lambda_{s2}/\lambda_{s1})(\tilde{g}_1)$. Additionally, in the boundary conditions, $R_{\lambda_{sy}}^x$ is the reflectance of reflector x at wavelength $\lambda_{sy}$, where reflectance is the ratio between reflected and incident intensity.

Based on these equations, it is believed that after reaching generation threshold the intensity of energy output by fiber 110 at wavelength $\lambda_{s1}$ increases monotonically as the intensity of energy at wavelength $\lambda_p$ input into fiber 110 is increased until the intensity of energy at $\lambda_p$ reaches a value $I_{crit}$. Below $I_{crit}$, the intensity of energy output by fiber 110 at wavelength $\lambda_{s2}$ is about zero. Above $I_{crit}$, the intensity of energy output by fiber 110 at wavelength $\lambda_2$ increases monotonically while the energy output by fiber 110 at wavelength $\lambda_{s1}$ remains substantially constant. The particular value of $I_{crit}$ depends, at least in part, upon the transmission of reflectors 130 and 160.

Figure 2:
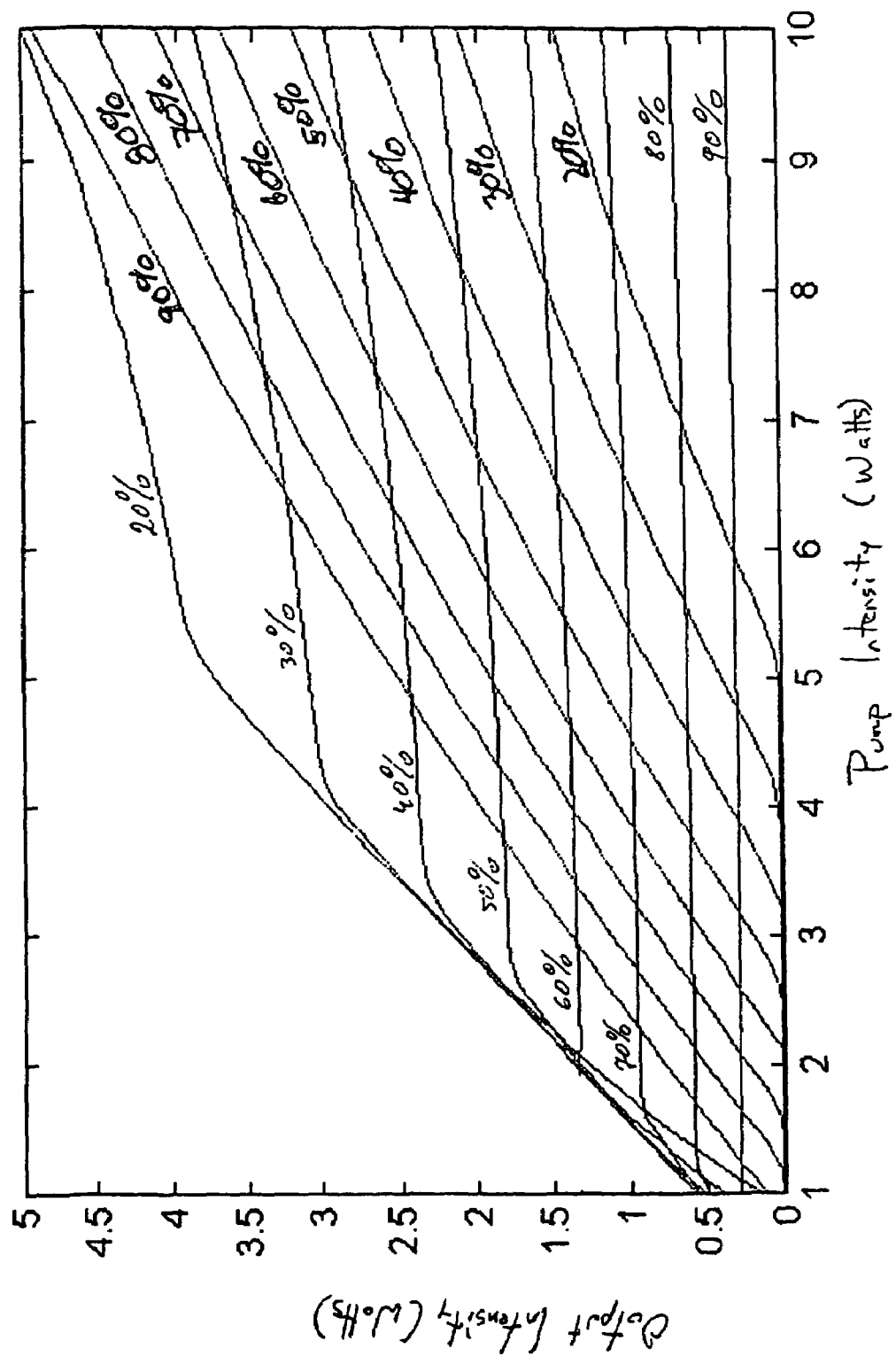
FIG. 2 is a plot of output energy intensity as a function of pump energy intensity for embodiments of a Raman fiber laser.

FIG. 2 shows the calculated output intensities for fiber 110 for system 1000 as a function of the intensity of the pump energy ($\lambda_p$) where the reflectance of reflector 130 for energy impinging thereon at wavelength $\lambda_{s1}$ is varied (20%, 30%, 40%, 50%, 60%, 70%, 80%, 90%) and where reflector 160 reflects 50% of energy impinging thereon at wavelength $\lambda_{s2}$. In this example, $\lambda_{s2}$ is 1480 nm, $\lambda_{s1}$ is 1455 nm, and fiber 110 is formed of fused silica with $GeO_2$ as the Raman active material.

Figure 3:
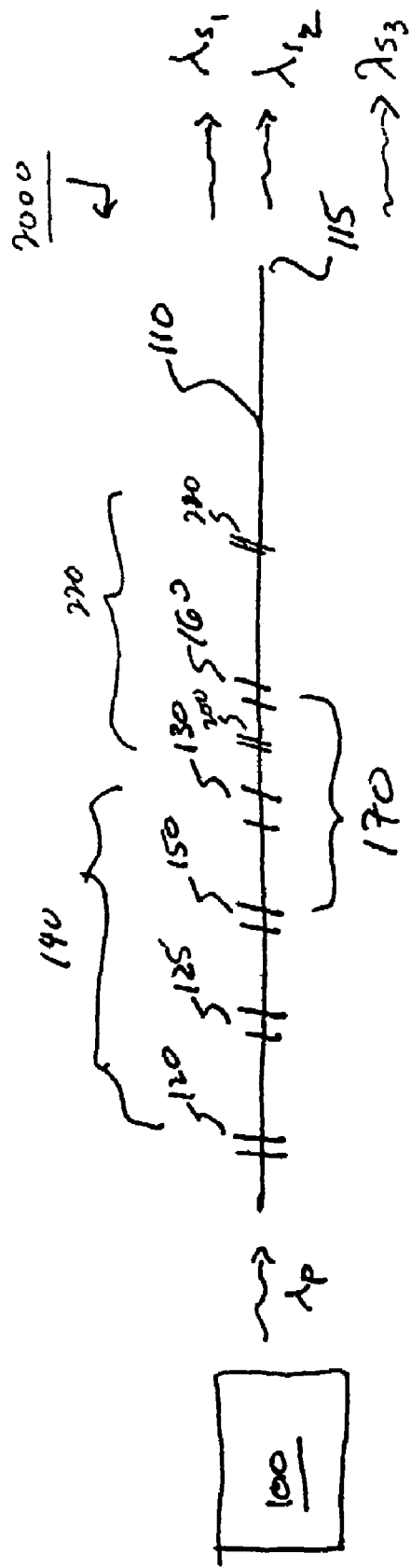
FIG. 3 is a schematic representation of an embodiment of a Raman fiber laser system.

FIG. 3 shows a Raman fiber laser system 2000 in which fiber 110 includes reflector 125 and pairs of reflectors 120 and 130, and 150 and 160. Fiber 110 also includes a pair of reflectors 200 and 210. Reflector 200 is configured to reflect substantially all (e.g., about 100%) energy impinging thereon at a wavelength $\lambda_{s3}$, where $\lambda_{s3}^{-1}=\lambda_{s2}^{-1}-\lambda_{r3}^{-1}$, where $(c/\lambda_{r3})$ is a Raman Stokes shift frequency within the Raman gain spectrum of the Raman active material in the gain medium of fiber 110 ($\lambda_{r3}^{-1}$ may be the same as or different from $\lambda_{r2}^{-1}$ and/or $\lambda_{r1}^{-1}$). Reflector 210 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s3}$. Reflectors 200 and 210 form a resonance cavity 220 in fiber 110 for energy at wavelength $\lambda_{s3}$.

With this arrangement, energy at wavelength $\lambda_p$ generally propagates in fiber 110 as described above. In addition, energy at wavelengths $\lambda_{s1}$ and $\lambda_{s2}$ generally is formed and propagates in fiber 110 as described above. As energy at wavelength $\lambda_{s2}$ propagates through fiber 110 (e.g., in the overlapping region of cavities 170 and 220), it interacts with the Raman active material in the gain medium of fiber 110 to create energy at wavelength $\lambda_{s3}$. Energy at wavelength $\lambda_{s3}$ in cavity 220 that is propagating in the reverse direction is reflected by reflector 200 and then propagates through fiber 110 in the forward direction. Energy at wavelength $\lambda_{s3}$ propagating in cavity 220 in the forward direction impinges on reflector 210. Some of the energy at $\lambda_{s3}$ impinging on reflector 210 is reflected by reflector 210 and then propagates through cavity 220 in the reverse direction, and some of the energy at $\lambda_{s3}$ impinging on reflector 210 passes through reflector 210 and exits fiber 110 (e.g., at end 115). It is to be noted that, in this embodiment, $\lambda_p$ directly pumps only $\lambda_{s1}$, $\lambda_{s2}$ is directly pumped by only $\lambda_{s1}$, and that $\lambda_{s3}$ is directly pumped only by $\lambda_{s2}$.

Resonance cavities 140 and 170 are linked resonance cavities, and resonance cavities 170 and 220 are linked resonance cavities.

Figure 4:
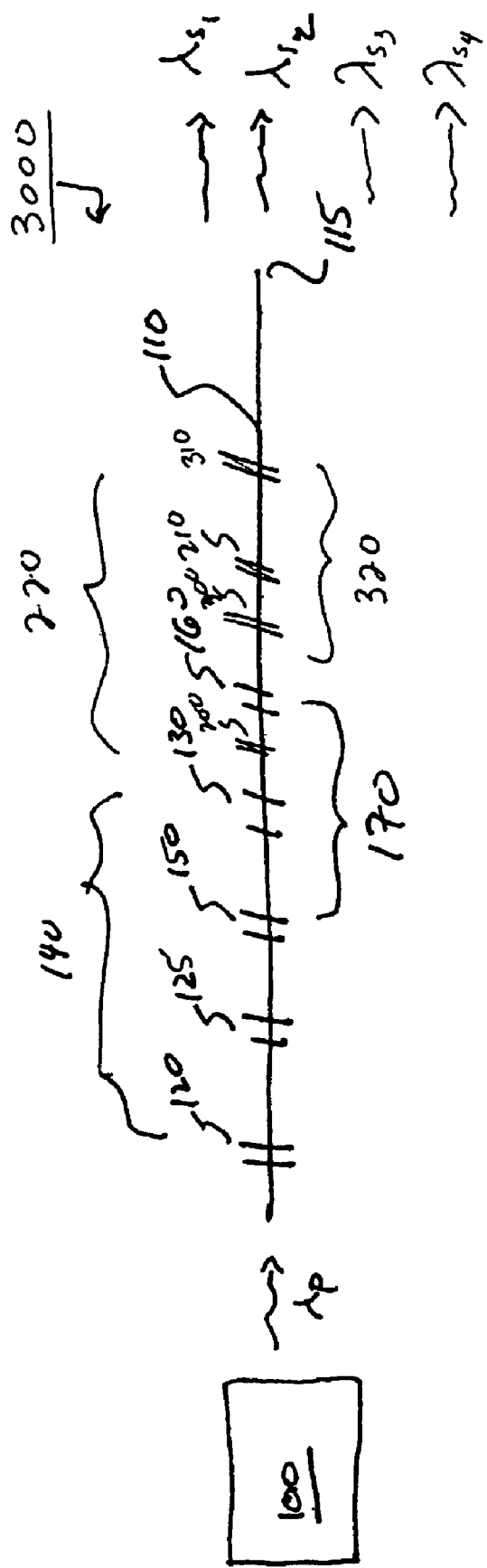
FIG. 4 is a schematic representation of an embodiment of a Raman fiber laser system.

FIG. 4 shows a Raman fiber laser system 3000 in which fiber 110 includes reflector 125 and pairs of reflectors 120 and 130, 150 and 160, and 200 and 210. Fiber 110 also includes a pair of reflectors 300 and 310. Reflector 300 is configured to reflect substantially all (e.g., about 100%) energy impinging thereon at a wavelength $\lambda_{s4}$, where $\lambda_{s4}^{-1}=\lambda_{s3}^{-1}-\lambda_{r4}^{-1}$, where $(c/\lambda_{r4})$ is a Raman Stokes shift frequency within the Raman gain spectrum of the Raman active material in the gain medium of fiber 110 ($\lambda_{r4}^{-1}$ may be the same as or different from $\lambda_{r3}^{-1}$, $\lambda_{r2}^{-1}$ and/or $\lambda_{r1}^{-1}$). Reflector 310 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s4}$. Reflectors 300 and 310 form a resonance cavity 320 in fiber 110 for energy at wavelength $\lambda_{s4}$.

With this arrangement, energy at wavelength $\lambda_p$ generally propagates in fiber 110 as described above. In addition, energy at wavelengths $\lambda_{s1}$, $\lambda_{s2}$ and $\lambda_{s3}$ generally is formed and propagates in fiber 110 as described above. As energy at wavelength $\lambda_{s3}$ propagates through fiber 110 (e.g., in the overlapping region of cavities 220 and 320), it interacts with the Raman active material in the gain medium of fiber 110 to create energy at wavelength $\lambda_{s4}$. Energy at wavelength $\lambda_{s4}$ in cavity 320 that is propagating in the reverse direction is reflected by reflector 300 and then propagates through fiber 110 in the forward direction. Energy at wavelength $\lambda_{s4}$ propagating in cavity 320 in the forward direction impinges on reflector 310. Some of the energy at $\lambda_{s4}$ impinging on reflector 310 is reflected by reflector 310 and then propagates through cavity 320 in the reverse direction, and some of the energy at $\lambda_{s4}$ impinging on reflector 310 passes through reflector 310 and exits fiber 110 (e.g., at end 115). It is to be noted that, in this embodiment, $\lambda_p$ directly pumps only $\lambda_{s1}$, $\lambda_{s2}$ is directly pumped by only $\lambda_{s1}$, $\lambda_{s3}$ is directly pumped only by $\lambda_{s2}$, and $\lambda_{s4}$ is directly pumped only by $\lambda_{s3}$.

Resonance cavities 140 and 170 are linked cavities, resonance cavities 170 and 220 are linked cavities, and resonance cavities 170 and 220 are linked cavities.

While the foregoing description has been made for a system containing two, three or four pairs of reflectors, the invention is not limited in this manner. Rather, the number of pairs of reflectors can be greater than two (e.g., five pairs of reflectors, six pairs of reflectors, seven pairs of reflectors, eight pairs of reflectors, nine pairs of reflectors, 10 pairs of reflectors, etc.). In general, the pairs of reflectors are arranged so that each pair of reflectors forms a resonance cavity at a respective wavelength corresponding to a Raman Stokes shift. Typically, each pair of reflectors includes one reflector that reflects substantially all (e.g., about 100%) energy at the Raman Stokes shift wavelength (e.g., disposed closer to the point of the optical fiber where the pump energy enters the fiber) and one reflector that partially reflects energy at the Raman Stokes shift wavelength (e.g., disposed further from the point of the optical fiber where the pump energy enters the fiber). Usually, the resonance cavities are arranged so that the resonance cavity for energy at the wavelength $\lambda_{sn}$ overlaps only with a maximum of two resonance cavities. One of the two resonance cavities is for energy at the wavelength $\lambda_{sn-1}$, where $\lambda_{sn-1}^{-1}=\lambda_{sn}^{-1}+\lambda_{rn}^{-1}$ and the other of the two resonance cavities is for energy at the wavelength $\lambda_{sn+1}$, where $\lambda_{sn+1}^{-1}=\lambda_{sn}^{-1}+\lambda_{rn+1}^{-1}$ ($\lambda_{rn}^{-1}$ and $\lambda_{rn+1}^{-1}$ being Stokes shifts within the Raman gain spectrum of the active material in the gain medium of fiber 110; $\lambda_{rn}^{-1}$ and $\lambda_{rn+1}^{-1}$ being the same or different). Generally, relative to the resonance cavity for energy at wavelength $\lambda_{sn}$, the resonance cavity for energy at $\lambda_{sn-1}$ is closer to the portion of fiber 110 where the energy at wavelength $\lambda_p$ enters fiber 110, and the resonance cavity for energy at $\lambda_{sn+1}$ is further from the portion of fiber 110 where the energy at wavelength $\lambda_p$ enters fiber 110. Typically, the resonance cavity having a resonance frequency closest to $\lambda_p^{-1}$ overlaps with only one other resonance cavity, and the resonance cavity having a resonance frequency furthest from $\lambda_p^{-1}$ overlaps with only one other resonance cavity.

Although systems have been described in which each resonance cavity is formed of a pair of reflectors with one reflector that only partially reflects energy at the corresponding wavelength of the resonance cavity, the invention is not limited in this sense. In certain embodiments, one or more of the pairs of reflectors can have both reflectors that only partially reflect energy at the corresponding wavelength of the resonance cavity. In some embodiments, one or more of the pairs of reflectors can have both reflectors that reflect substantially (e.g., about 100%) the energy at the corresponding wavelength of the resonance cavity.

Moreover, the invention is not limited to systems in which the reflectance of a reflector is fixed. In some embodiments, the reflectance of a reflector can be variable. For example, the amount of energy reflected off reflectors 130, 160, 210, and/or 310 at their respective corresponding wavelengths can be variable. In certain embodiments, the amount of energy reflected off reflectors 120, 150, 200, and/or 300 at their respective corresponding wavelengths can be variable. Various combinations of tunable reflectors are contemplated. Furthermore, these systems can include, for example, appropriate electronics to form a feedback loop so that the systems can monitor the intensity of energy output at one or more wavelengths and vary the reflectance of one or more reflectors (e.g., vary the reflectance of one or more reflectors in real time) to obtain one or more desired output intensities at one or more wavelengths.

In certain embodiments, a reflector can be formed of a variable output coupler. Such couplers are described, for example, in commonly owned P.C.T. Patent Application Serial PCT/US02/19420, filed on Jun. 19, 2002, and entitled "Apparatus and Method for Variable Optical Output Control", and published as WO 03/001262 A1 on Jan. 3, 2003, and which is hereby incorporated by reference.

In addition, one or more of the resonance cavities contained within a Raman fiber laser system can contain a suppressor that is designed to substantially reduce (e.g., substantially eliminate) the formation of unwanted energy in the resonance cavity or cavities. Typically, such unwanted energy corresponds to energy at higher order Stokes shifts than the resonance energy for the resonance cavity. The suppressor can be, for example, a long period grating having a resonance frequency corresponding to the frequency of the undesired energy.

Figure 5:
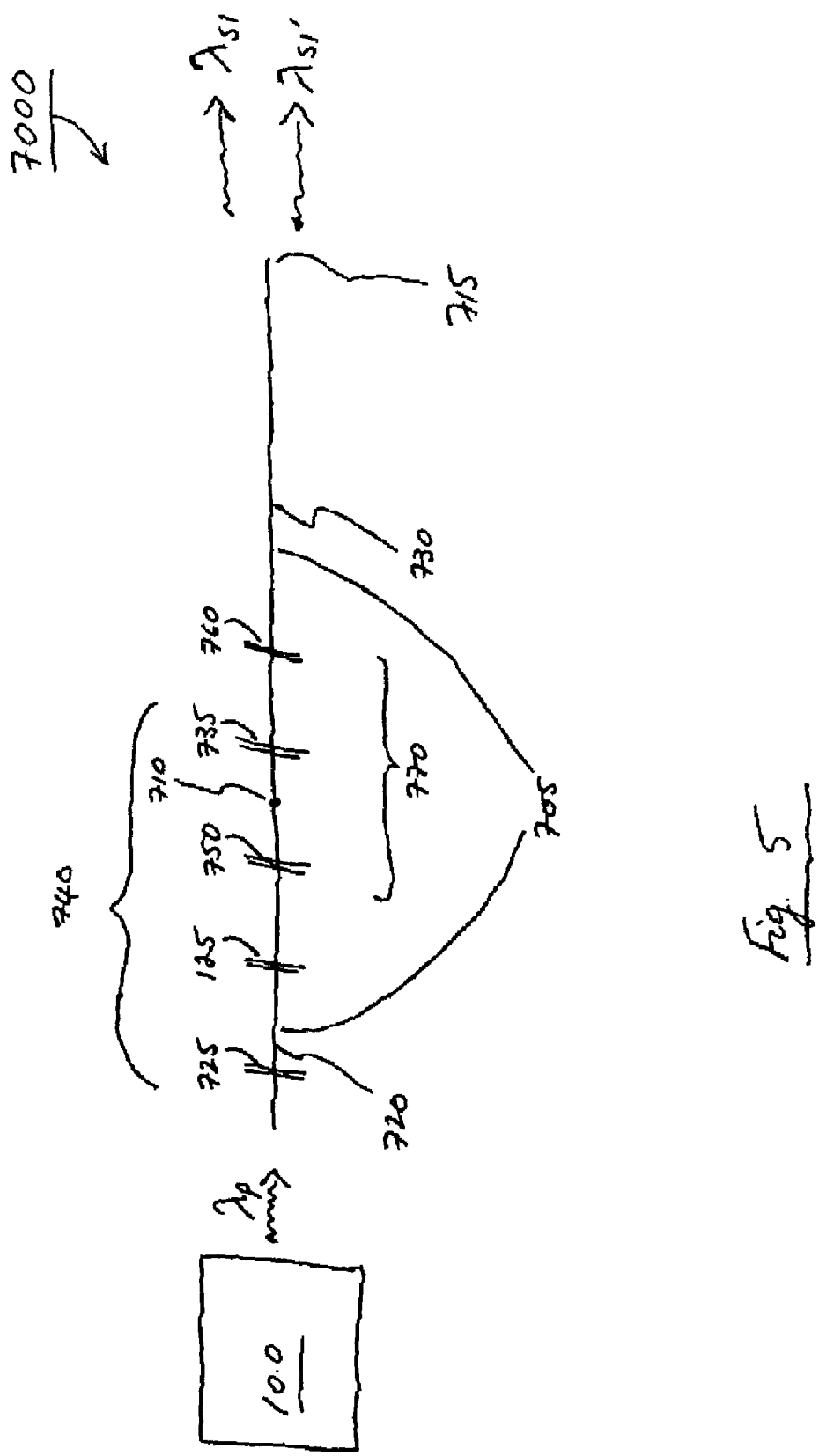
FIG. 5 is a schematic representation of an embodiment of a Raman fiber laser system.

In some embodiments, an optical fiber can be formed of more than one segment of fiber coupled together. For example, FIG. 5 shows a Raman fiber laser system 7000 including laser 100 and an optical fiber 705. Optical fiber 705 has a first section 720 with a gain medium containing a Raman active material and a second section 730 with a gain medium containing a Raman active material. Sections 720 and 730 are coupled together at point 710 (e.g., spliced together). The Raman active material of the gain medium in section 720 may be the same as or different from the Raman active material of the gain medium in section 730. In some embodiments, sections 720 and 730 may have the same Raman active material in their respective gain media, but the concentration of the Raman active material in section 720 is different than the concentration of the Raman active material in section 730. In certain embodiments, sections 720 and 730 may have the same Raman active material in their respective gain media, but the radius of the portion of section 720 that contains the Raman active material is different than the radius of the portion of section 730 that contains the Raman active material in section 730. Various combinations of active material, radius and active material concentration in segments 720 and 730, respectively, can be used. It is to be noted that in embodiments where sections 720 and 730 contain the same Raman active material having the same concentration and radius, the position of splice point 710 can have substantially no impact on the performance of system 7000.

Optical fiber 705 includes reflector 125, and pairs of reflectors 725 and 735 forming resonance cavity 740. Reflector 725 is configured to reflect substantially all (e.g., about 100%) energy impinging thereon at wavelength $\lambda_{s1}$, where $\lambda_{s1}^{-1} = \lambda_p^{-1} - \lambda_{r1}^{-1}$ and $(c/\lambda_{r1})$ is a Raman Stokes shift frequency within the Raman gain spectrum of the Raman active material in section 720. Reflector 735 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s1}$. Reflectors 725 and 735 form a resonance cavity 740 in fiber 705 for energy at wavelength $\lambda_{s1}$. A portion of resonance cavity 740 is in section 720 of fiber 705, and a portion of resonance cavity 740 is in section 730 of fiber 705.

Fiber 705 further includes a pair of reflectors 750 and 760. Reflector 750 is configured to reflect substantially all (e.g., about 100%) energy impinging thereon at wavelength $\lambda_{s1'}$, where $\lambda_{s1'}^{-1} = \lambda_{s1}^{-1} - \lambda_{r1'}^{-1}$ and $(c/\lambda_{r1'})$ is a Raman Stokes shift frequency within the Raman gain spectrum of the Raman active material in section 730. Reflector 760 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s1'}$. Reflectors 750 and 760 form a resonance cavity 770 in fiber 705 for energy at wavelength $\lambda_{s1'}$.

With this arrangement, energy at wavelength $\lambda_p$ enters optical fiber 705 in section 720. The energy at $\lambda_p$ propagates through section 720 of fiber 705 and impinges upon reflector 125 where it is reflected and propagates in section 720 of fiber 705 in the reverse direction. As energy at $\lambda_p$ propagates through section 720 of fiber 705 it interacts with the Raman active material in the gain medium of section 720 of fiber 705 to create energy at wavelength $\lambda_{s1}$. Energy at $\lambda_{s1}$ in cavity 740 that is propagating in the forward direction can propagate in the gain medium of sections 720 and 730 prior to impinging upon reflector 735. A portion of the energy at $\lambda_{s1}$ that impinges on reflector 735 continues to propagate to propagate through fiber 705 in the forward direction and exits fiber 705 (e.g., at an end 715 of fiber 705). The portion of energy at $\lambda_{s1}$ that is reflected by reflector 735 can propagate in sections 720 and 730 of fiber 705 in the reverse direction until it reaches reflector 725 where it is reflected and propagates through fiber 705 in the forward direction within cavity 740.

As energy at $\lambda_1$ propagates in section 730 of fiber 705 (e.g., between splice point 710 and reflector 735), it can interact with the Raman active material of the gain medium of section 730 to create energy at wavelength $\lambda_{s1'}$. Energy at wavelength $\lambda_{s1'}$ in cavity 770 that is propagating in the reverse direction is reflected by reflector 750 and then propagates through fiber 705 in the forward direction. Energy at wavelength $\lambda_{s1'}$ propagating in cavity 770 in the forward direction impinges on reflector 760. Some of the energy impinging on reflector 760 is reflected by reflector 760 and then propagates through cavity 770 in the reverse direction, and some energy at $\lambda_{s1'}$ impinging on reflector 760 passes through reflector 760 and exits fiber 705 (e.g., at end 715). It is to be noted that, in this embodiment, $\lambda_p$ directly pumps only $\lambda_{s1}$, and that $\lambda_{s1'}$ is directly pumped only by $\lambda_{s1}$. The order of the reflectors, however, can be varied. For example, reflector 760 can be located to the left of reflector 735, or the right side of splice point 710, or the like.

Resonance cavities 740 and 770 are linked cavities.

Without wishing to be bound by theory, it is believed that this design can allow for enhanced control of the intensity of energy output by fiber 705 at wavelengths $\lambda_{s1}$ and $\lambda_{s1'}$ by controlling (e.g., independently controlling) the transmission of reflectors 735 and/or 760, and/or the intensity of the pump energy. It is believed that the performance of fiber 705, in the case where reflector 735 is positioned in close proximity to reflector 760 (i.e., $z_{125} \approx z_{750} \approx z_{710}$ and $z_{735} \approx z_{760}$), can be explained, at least in part, using the following system of equations.

$$\frac{dI_p^+}{dz} = -g_p(I_{\lambda_{sI}}^+ + I_{\lambda_{sI}}^-) \times I_p^+ - \alpha_p I_p^+ = -\frac{dI_p^-}{dz}$$

$$\frac{d\hat{I}_{\lambda_{sI}}^+}{dz} = -g_1 \hat{I}_{\lambda_{sI}}^+ \times (I_p^+ + I_p^-) - \alpha_1 \hat{I}_{\lambda_{sI}}^+ = -\frac{d\hat{I}_{\lambda_{sI}}^+}{dz}$$

-continued $$\frac{d\tilde{I}^+_{\lambda_{sl}}}{dz} = -\tilde{g}_1 \tilde{I}^+_{\lambda_{sl}} \times (I^+_{\lambda_{sl'}} + I^-_{\lambda_{sl'}}) - \tilde{\alpha}_1 \tilde{I}^+_{\lambda_{sl}} = -\frac{d\tilde{I}^-_{\lambda_{sl}}}{dz}$$

$$\frac{d I^+_{\lambda_{sl'}}}{dz} = \tilde{g}_{1'} I^+_{\lambda_{sl'}} \times (\tilde{I}^+_{\lambda_{sl}} + \tilde{I}^-_{\lambda_{sl}}) - \alpha_{1'} I^+_{\lambda_{sl'}} = -\frac{d I^-_{\lambda_{sl'}}}{dz}$$

The indices $^+$ and $^-$ represent propagation in fiber 705 from left to right and from right to left, respectively. $I_p$, $I_{\lambda_{s1}}$, and $I_{\lambda_{s1'}}$ represent the intensities of energy propagating in fiber 705 at wavelengths $\lambda_p$, $\lambda_{s1}$, and $\lambda_{s1'}$, respectively. $\alpha_p$, $\alpha_{1'}$, are the loss coefficients of energy propagating in fiber 705 at wavelengths $\lambda_p$ and $\lambda_{s1'}$, respectively, due to, for example, imperfections, scattering and/or splicing in fiber 705. $\alpha_1$ and $\tilde{\alpha}_1$ are loss coefficients for sections 720 and 730, respectively, for energy at wavelength $\lambda_{s1}$ (e.g., due to imperfections, scattering and/or splicing). $g_p$ and $g_{1'}$ are the Raman gain coefficients for energy propagating in fiber 705 at wavelengths $\lambda_p$ and $\lambda_{s1'}$, respectively, due to power gain from stimulated Raman scattering (SRS). $g_1$, $\tilde{g}_1$ are Raman gain coefficients for energy propagating in sections 720 and 730, respectively, at $\lambda_{s1}$ due to power gain from stimulated Raman scattering (SRS). $g_1 = (\lambda_{s1}/\lambda_{s1'})(\tilde{g}_1)$. The boundary conditions at the reflectors and splice point are given by:

$$I_p^+(z=0)=I_0; I_p^-(z=z_{125})=R_{\lambda_p}{}^{125} \times I_p^+(z=z_{125});$$

$$\hat{I}_{\lambda_{s1}}{}^+(z=z_s))=\tilde{I}_{\lambda_{s1}}{}^+(z=z_s); \hat{I}_{\lambda_{s1}}{}^-(z=z_s)=\tilde{I}_{\lambda_{s1}}{}^+(z=z_s)$$

$$\hat{I}_{\lambda_{s1}}{}^+(z=z_{725})=R_{\lambda_{s1}}{}^{725} \times \hat{I}_{\lambda_{s1}}{}^-(z=z_{735}); \tilde{I}_{\lambda_{s1}}{}^-(z=z_{735})=R_{\lambda_{s1}}{}^{735} \times \tilde{I}_{\lambda_{s1}}{}^+(z=z_{735});$$

$$I_{\lambda_{s1'}}{}^+(z=z_{750})=R_{\lambda_{s1'}}{}^{750} \times I_{\lambda_{s1'}}{}^-(z=z_{750}); I_{\lambda_{s1'}}{}^-(z=z_{760})=R_{\lambda_{s1'}}{}^{760} \times I_{\lambda_{s1'}}{}^+(z=z_{760});$$

Here $z_s$ is the splice point of two fibers, and $z_x$ and $R_{\lambda_{sy}}{}^x$ are as defined above. $I_0$ is the total pump power.

Figure 6:
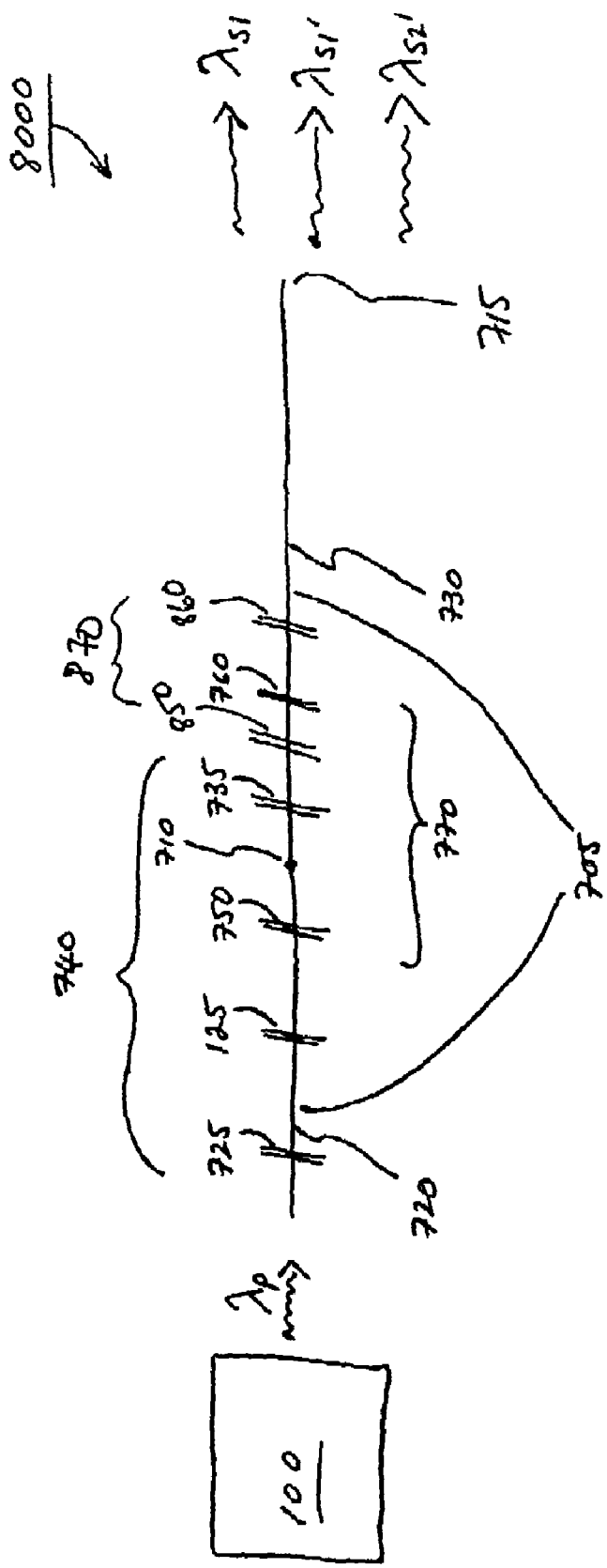
FIG. 6 is a schematic representation of an embodiment of a Raman fiber laser system.

FIG. 6 shows a Raman fiber laser system 8000 including laser 100 and optical fiber 705 with sections 720 and 730 coupled at point 710. Fiber 705 includes reflector 125, and pairs of reflectors 725 and 735, and 750 and 760, forming resonance cavities 740 and 770, respectively. Fiber 110 also includes a pair of reflectors 850 and 860 (e.g., fiber Bragg gratings). Reflector 850 is configured to reflect substantially all (e.g., about 100%) energy impinging thereon at wavelength $\lambda_{s2'}$, where $\lambda_{s2'}{}^{-1}=\lambda_{s1'}{}^{-1}-\lambda_{r2'}{}^{-1}$, and $(c/\lambda_{r2'})$ is a Raman Stokes shift frequency within the Raman gain spectrum of the Raman active material in section 730 ($\lambda_{r2'}{}^{-1}$ can be the same as or different from $\lambda_{r1'}{}^{-1}$). Reflector 860 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s2'}$. Reflectors 850 and 860 form a resonance cavity 870 in fiber 705 for energy at wavelength $\lambda_{s2'}$.

With this arrangement, energy at $\lambda_p$ generally propagates in fiber 705 as described above. In addition energy at wavelengths $\lambda_{s1}$ and $\lambda_{s1'}$ generally is formed and propagates through fiber 705 as described above. As energy at wavelength $\lambda_{s1'}$ propagates through section 730 of fiber 705 (e.g., in the region overlapping cavities 770 and 870), it interacts with the Raman active material of section 730 of fiber 705 to create energy at wavelength $\lambda_{s2'}$. Energy at wavelength $\lambda_{s2'}$ in cavity 870 that is propagating in the reverse direction is reflected by reflector 850 and then it propagates through fiber 705 in the forward direction. Energy at wavelength $\lambda_{s2'}$ propagating in cavity 870 in the forward direction impinges on reflector 860. Some of the energy at $\lambda_{s2'}$ impinging on reflector 860 is reflected by reflector 860 and then propagates through cavity 870 in the reverse direction, and some of the energy at $\lambda_{s2'}$ impinging on reflector 860 passes through reflector 860 and exits fiber 705 (e.g., at end 715). It is to be noted that, in this embodiment, $\lambda_p$ directly pumps only $\lambda_{s1}$, $\lambda_{s1'}$ is directly pumped only by $\lambda_{s1}$, and $\lambda_{s2'}$ is directly pumped only by $\lambda_{s1'}$.

Resonance cavities 740 and 770 are linked cavities, and resonance cavities 770 and 870 are linked cavities.

Figure 7:
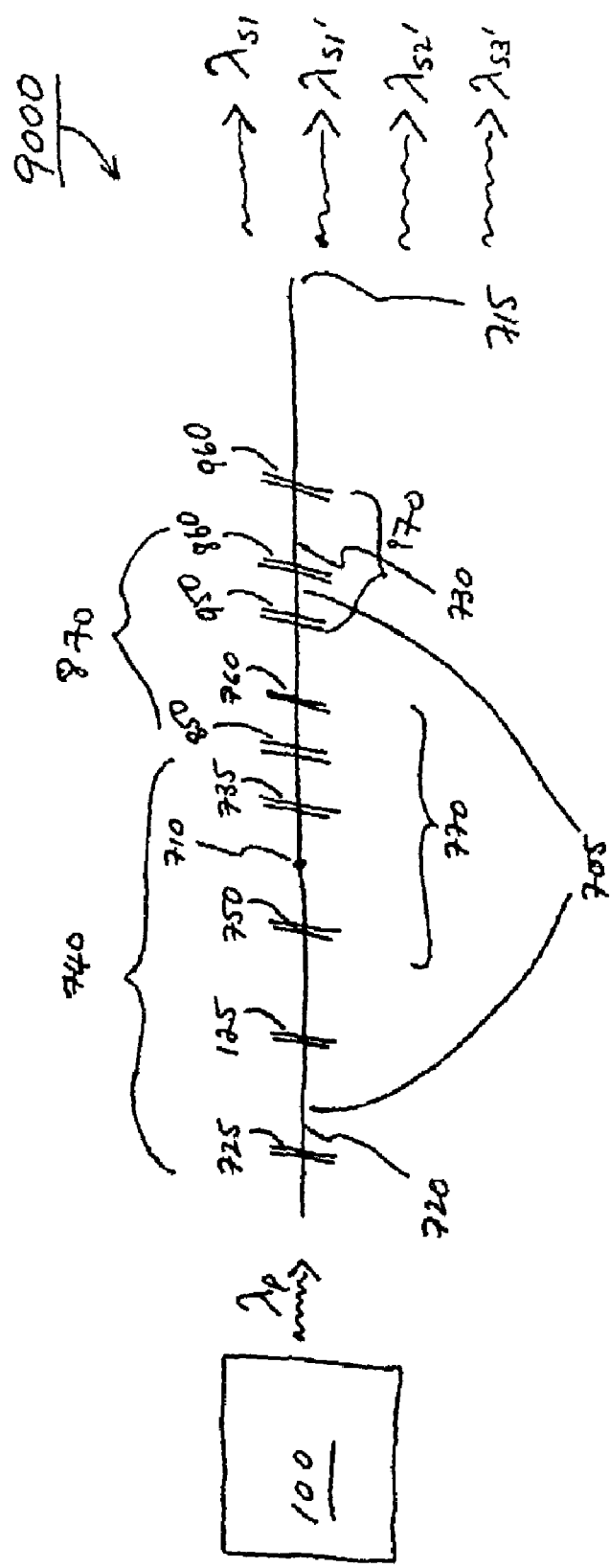
FIG. 7 is a schematic representation of an embodiment of a Raman fiber laser system.

FIG. 7 shows a Raman fiber laser system 9000 including laser 100 and optical fiber 705 with sections 720 and 730 coupled at point 710. Fiber 705 includes reflector 125, and pairs of reflectors 725 and 735, 750 and 760, and 850 and 860, forming resonance cavities 740, 770 and 870, respectively. Fiber 705 also includes a pair of reflectors 950 and 960 (e.g., fiber Bragg gratings). Reflector 950 is configured to reflect substantially all (e.g., about 100%) energy impinging thereon at wavelength $\lambda_{s3'}$, where $\lambda_{s3'}{}^{-1}=\lambda_{s2'}{}^{-1}-\lambda_{r3'}{}^{-1}$, and $(c/\lambda_{r3'})$ is a Raman Stokes shift frequency within the Raman gain spectrum of the Raman active material in section 730 ($\lambda_{s3'}{}^{-1}$ can be the same as or different than $\lambda_{r1'}{}^{-1}$ and/or $\lambda_{r2'}{}^{-1}$). Reflector 960 is configured to reflect a portion (e.g., less than about 98%, less than about 95%, less than about 90%, less than about 80%, less than about 70%, less than about 60%, less than about 50%, less than about 40%, less than about 20%, less than about 10%) of energy impinging thereon at wavelength $\lambda_{s3'}$. Reflectors 950 and 960 form a resonance cavity 970 in fiber 705 for energy at wavelength $\lambda_{s3'}$.

With this arrangement, energy at $\lambda_p$ generally propagates in fiber 705 as described above. In addition energy at wavelengths $\lambda_{s1}$, $\lambda_{s1'}$ and $\lambda_{s2'}$ generally is formed and propagates through fiber 705 as described above. As energy at wavelength $\lambda_{s2'}$ propagates through section 730 of fiber 705 (e.g., in the region overlapping cavities 870 and 970), it interacts with the Raman active material of section 730 of fiber 705 to create energy at wavelength $\lambda_{s3'}$. Energy at wavelength $\lambda_{s3'}$ in cavity 970 that is propagating in the reverse direction is reflected by reflector 950 and then it propagates through fiber 705 in the forward direction. Energy at wavelength $\lambda_{s3'}$ propagating in cavity 970 in the forward direction impinges on reflector 960. Some of the energy at $\lambda_{s3'}$ impinging on reflector 960 is reflected by reflector 960 and then propagates through cavity 970 in the reverse direction, and some of the energy at $\lambda_{s3'}$ impinging on reflector 960 passes through reflector 960 and exits fiber 705 (e.g., at end 715). It is to be noted that, in this embodiment, $\lambda_p$ directly pumps only $\lambda_{s1}$, $\lambda_{s1'}$ is directly pumped only by $\lambda_{s1}$, $\lambda_{s2'}$ is directly pumped only by $\lambda_{s1'}$, and $\lambda_{s3'}$ is directly pumped only by $\lambda_{s2'}$.

Resonance cavities 740 and 770 are linked cavities, resonance cavities 770 and 870 are linked cavities, and resonance cavities 870 and 970 are linked cavities.

Although optical fibers with coupled segments having certain arrangements of splice points and reflectors have been described, the invention is not limited to such arrangements. In general, the splice points and reflectors can be arranged as appropriate to achieve one or more desired output intensities at one or more output wavelengths. As an example, with reference to FIG. 7, splice point 710 can optionally be between reflectors 725 and 750 or between reflectors 735 and 760. As another example, with reference to FIG. 8, splice point 710 can optionally be between reflectors 725 and 750, between reflectors 735 and 850, between reflectors 850 and 760 or between reflectors 760 and 860. In a further example, with reference to FIG. 9, splice point 710 can optionally be between reflectors 725 and 750, between reflectors 735 and 850, between reflectors 850 and 760, between reflectors 760 and 950, between reflectors 950 and 860 or between reflectors 960 and 860. Typically, the reflectors are arranged so that the resonance cavity for energy at a particular wavelength $\lambda_{sn}$ overlaps only with two resonance cavities (see discussion above). Moreover, it is to be understood that the number of resonance cavities, or portions of resonance cavities, in a particular segment of fiber can be varied as desired.

In addition, while systems containing an optical fiber with two segments of material have been disclosed, optical fibers having different numbers of segments can also be used. In general, the optical fiber can have N segments, where N is an integer greater than or equal to one. For example, the optical fiber can include more than two segments of material having the same or different Raman active material(s) (e.g., three segments, four segments, five segments, six segments, seven segments, eight segments, nine segments, 10 segments, etc.). In general, each section of the optical fiber can have a gain medium with an Raman active material which can be the same or different than the Raman active material in the gain medium of the neighboring section(s) of the fiber. In some embodiments, all sections of the optical fiber have a gain medium with the same Raman active material. In certain embodiments, all sections of the optical fiber have a gain medium with a different Raman active material than the Raman active material in the gain medium of the other sections. In some embodiments the Raman active material in the gain medium of the other sections can alternate. For example, a three-section optical fiber can be formed in which the Raman active material of the gain medium of the first and third sections is the same, and in which the Raman active material in the gain medium in the middle section is different. Other arrangements are contemplated.

Furthermore, while Raman fiber lasers and Raman fiber laser systems have been described in which sections of the optical fiber are spliced together, the invention is not limited in this sense. Generally, the sections of the fiber are coupled together so that energy can propagate therebetween. Typically, the sections of fiber are contiguous. For example, in some embodiments, two neighboring sections of the optical fiber can be connected by a lens (e.g., a Green lens). Optionally, free-space optics can be used to couple one or more segments of fiber.

Figure 8:
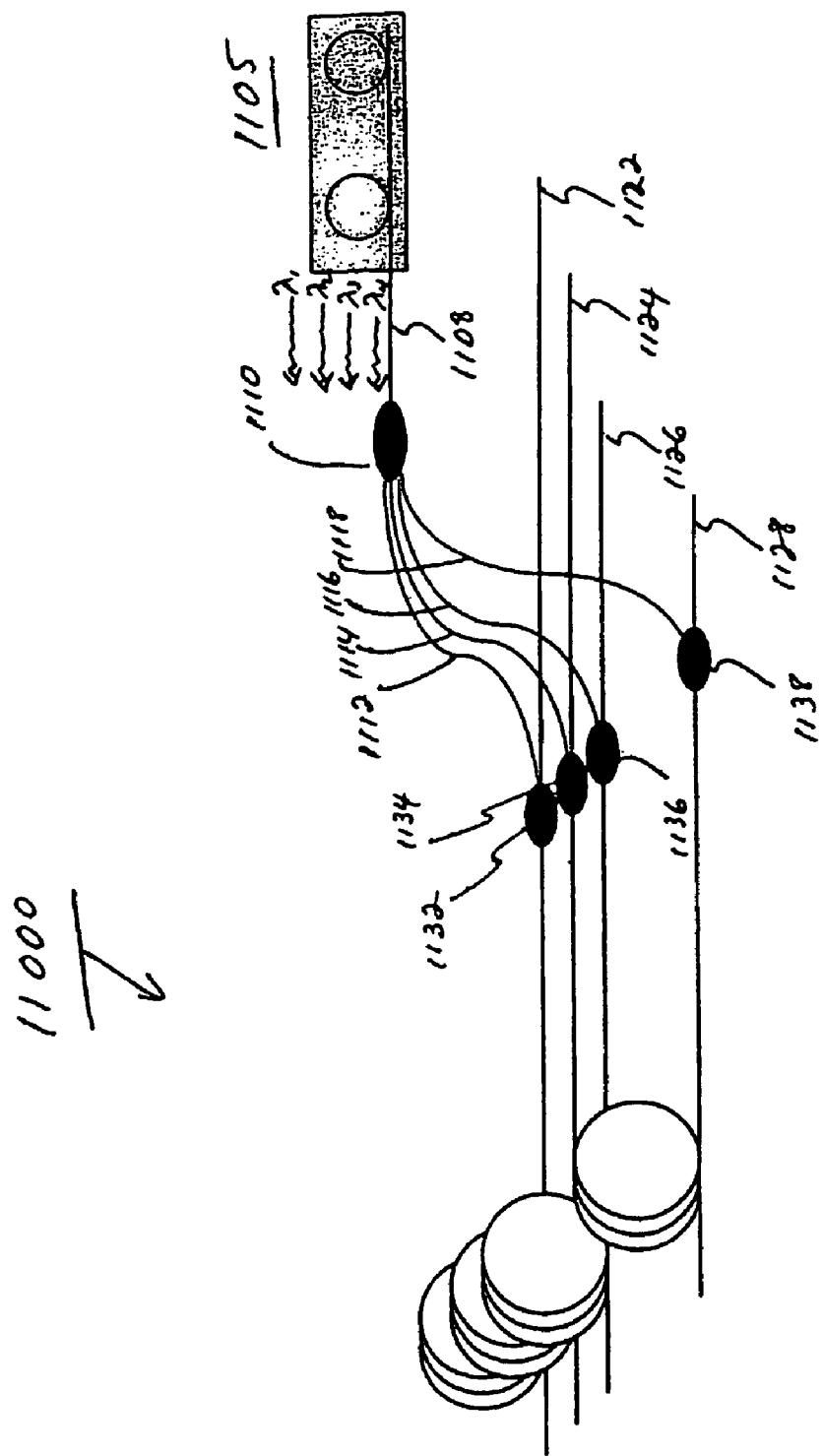
FIG. 8 is a schematic representation of an embodiment of a fiber amplifier system.

FIG. 8 is a schematic view of an embodiment of a fiber amplifier system 11000 in which a Raman fiber laser system 1105 that outputs energy at four wavelengths ($\lambda_1, \lambda_2, \lambda_3, \lambda_4$) is used to amplify the signals propagating along fibers 1122, 1124, 1126, and 1128 respectively. These output wavelengths exit system 1105 and enter a fiber 1108. Fiber 1108 is coupled to a splitter 1110, which couples a portion of the output energy at each wavelength ($\lambda_1, \lambda_2, \lambda_3, \lambda_4$) into fibers 1112, 1114, 1116, and 1118. The pump energy at each wavelength in each fiber 1112, 1114, 1116, and 1118 is coupled into fibers 1122, 1124, 1126, and 1128 respectively, via couplers 1132, 1134, 1136, and 1138 respectively. At least a portion of each of fibers 1122, 1124, 1126, and 1128 contain a gain medium that has a Raman active material. In fibers 1122, 1124, 1126, and 1128 the input signals interact with the pump energy from fibers 1112, 1114, 1116, and 1118, respectively and are amplified by stimulated Raman scattering.

Of course such a system is not limited to amplification of signals in four fibers, or amplification by four wavelengths. In general, a Raman fiber laser system with N output wavelengths, where N is an integer greater than or equal to one (e.g., one, two, three, four, five, six, seven, eight, nine, 10, etc.) can be used to amplify the signal in M different fibers, where M is an integer greater than or equal to one (e.g., one, two, three, four, five, six, seven, eight, nine, 10, etc.). In certain embodiments, M can be, for example, on the order of one hundred or more. In some embodiments, all the fibers in which the signals are amplified by the Raman fiber laser may be bound together in a single or several cables running in parallel (e.g., an under water fiber optic and/or ultra long haul applications).

Figure 9:
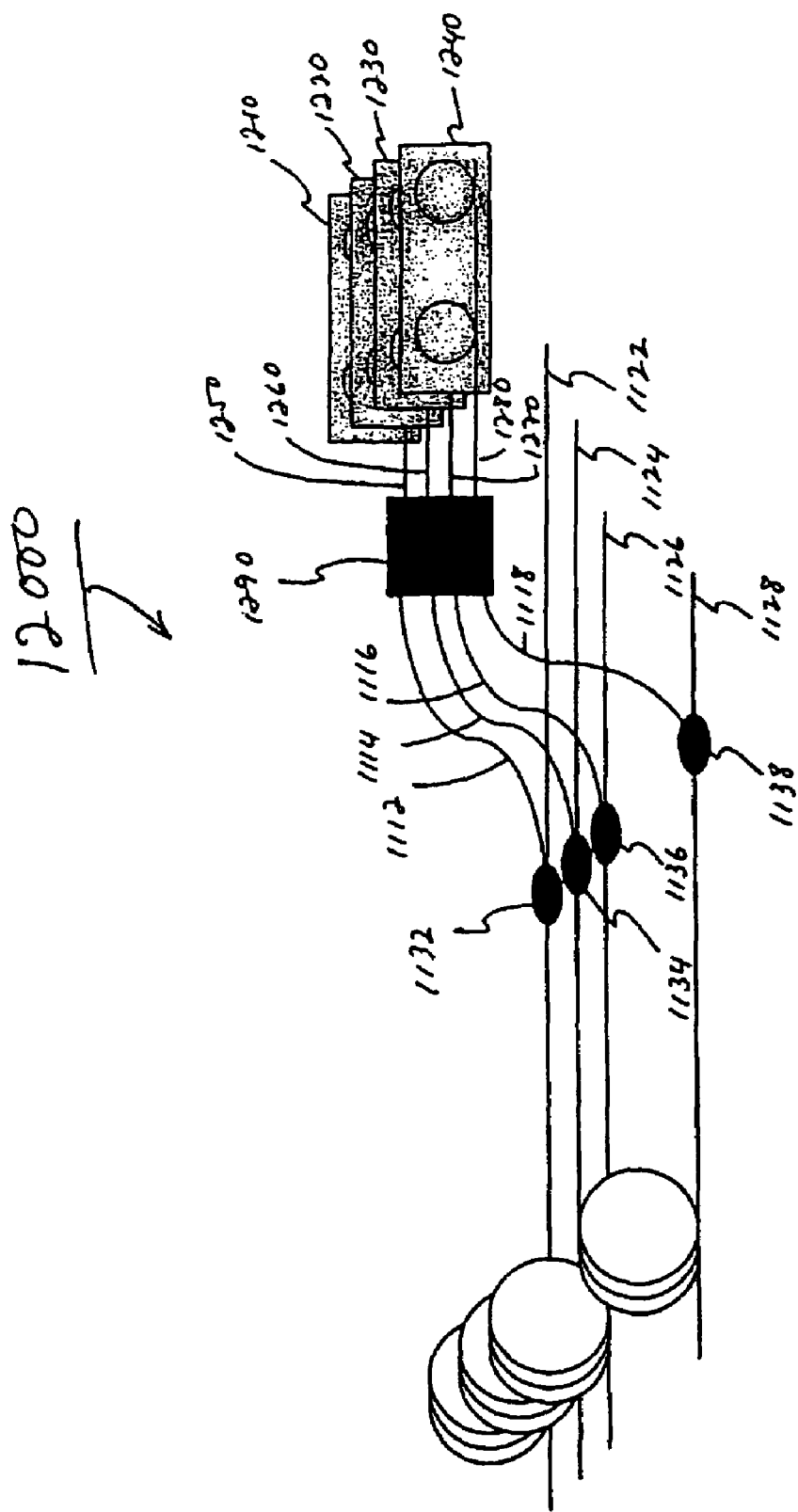
FIG. 9 is a schematic representation of an embodiment of a fiber amplifier system.

FIG. 9 depicts an embodiment of a fiber amplifier system 12000. System 12000 utilizes four Raman fiber laser systems 1210, 1220, 1230, and 1240, each system emitting energy at an output wavelength that exits systems 1210, 1220, 1230, and 1240 through fibers 1250, 1260, 1270, and 1280, respectively. The output energy from each laser 1210, 1220, 1230, and 1240, is coupled into at least one of the fibers 1112, 1114, 1116, and 1118 via a cross-coupler (e.g., a WDM) 1290. In some embodiments, a portion of output energy at each wavelength generated by each laser system 1210, 1220, 1230, and 1240 is coupled into each fiber 1112, 1114, 1116, and 1118, respectively via coupler 1290. The pump energy at each wavelength in each fiber 1112, 1114, 1116, and 1118 is coupled into fibers 1122, 1124, 1126, and 1128 respectively, via coupler 1132, 1134, 1136, and 1138 respectively. At least a portion of fibers 1122, 1124, 1126, and 1128 contain a gain medium that has a Raman active material. In fibers 1122, 1124, 1126, and 1128 the input signals interact with the pump energy and are amplified by stimulated Raman scattering.

Such a system 12000 is not limited to four lasers or four fibers. Any number of lasers may amplify the signal in any number of fibers. Moreover, a given fiber laser system can output more than one wavelength, which can be coupled into one or more fibers.

Figure 10:
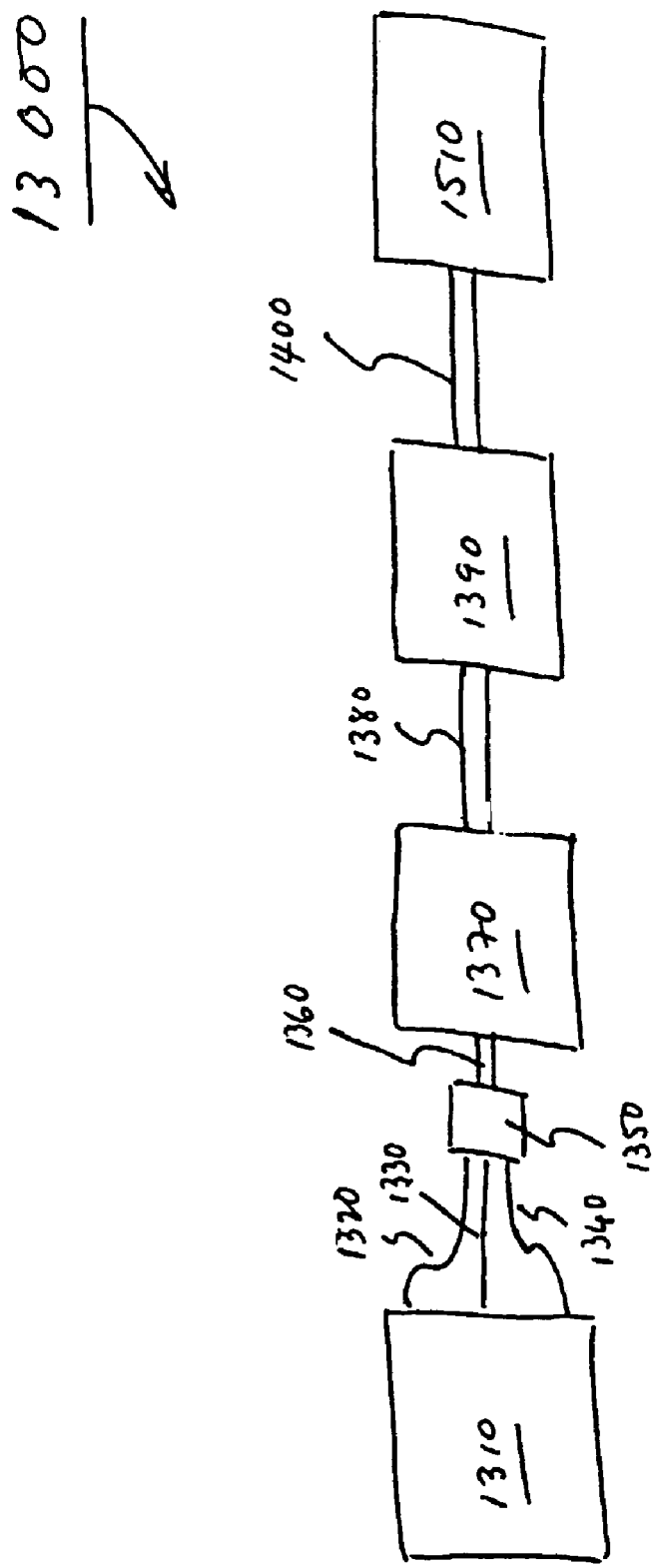
FIG. 10 is a schematic representation of an embodiment of a fiber laser system.

A further example of a fiber laser system 13000 is depicted schematically in FIG. 10. System 13000 includes a pump laser 1310 (e.g., a semiconductor diode laser) that is connected to a coupler 1350 via fibers 1320, 1330 and 1340. Combiner 1350 is connected to a fiber laser 1370 (e.g., a Ytterbium-doped double clad fiber) via a coupler 1360. Laser 1370 is in turn connected to Raman fiber laser 1390 (e.g., a Raman fiber laser having the structure described herein) via a coupler 1380, and a laser 1390 is connected to an output cascade 1510 via fiber a coupler 1400. In certain embodiments, laser 1390 and output cascade 1510 are integrated in a single unit.

During operation, energy at wavelength $\Lambda_p$ is generated by pump laser 1310 and propagates along fibers 1320, 1330, and 1340 and is coupled into fiber laser 1370 via combiner 1350 and coupler 1360. The energy at $\Lambda_p$ is converted by laser 1370 into energy at $\lambda_p$. Energy at $\lambda_p$ exits laser 1370, propagates along coupler 1380 and is coupled into Raman fiber laser 1390. Energy at wavelength $\lambda_p$ is converted to energy at one or more longer wavelengths. The energy at these wavelengths is coupled into output cascade 1510 by fiber 1400. Cascade 1510 optionally includes variable output couplers that can be dynamically adjusted to regulate the amount of energy allowed to exit system 13000 at desired wavelengths.

While certain embodiments have been described, the invention is not limited to these embodiments. For example, one or more sections of an optical fiber can be substantially devoid of a gain medium having a Raman active material. As a further example, the reflectors need not be in the form of fiber Bragg gratings. For example, one or more of the reflectors can be a loop mirror, or one or more reflectors can be in the form of a coated mirror (e.g., a coated mirror at one or both ends of a section of optical fiber). As another example, the suppressor(s) need not be in the form of LPG(s). For example, one or more of the suppressors can be in the form of gratings e.g., short period gratings, slanted gratings, etc.) that are substantially non-perpendicular to the length of the fiber along which energy propagates. In these embodiments, the angle and/or period of the gratings can be selected to scatter one or more wavelengths of interest (e.g., one or more higher order Raman Stokes shift wavelengths). As an additional example, the type of laser used for pumping can be varied. Examples of lasers that can be used include semiconductor diode lasers (e.g., high power semiconductor diode lasers), double clad doped fiber lasers, conventional free space coupled lasers, and the like. As another example, various types of optical fibers can be used, including, for example, double clad optical fibers and polarization maintaining optical fibers. Furthermore, the optical fibers can be formed of, for example, silica based materials (e.g., fused silica based) or fluoride-based materials. As yet another example, the relative and/or absolute lengths of one or more of the sections of the optical fiber can be varied based upon the intended use of the Raman fiber laser.

Figure 11:
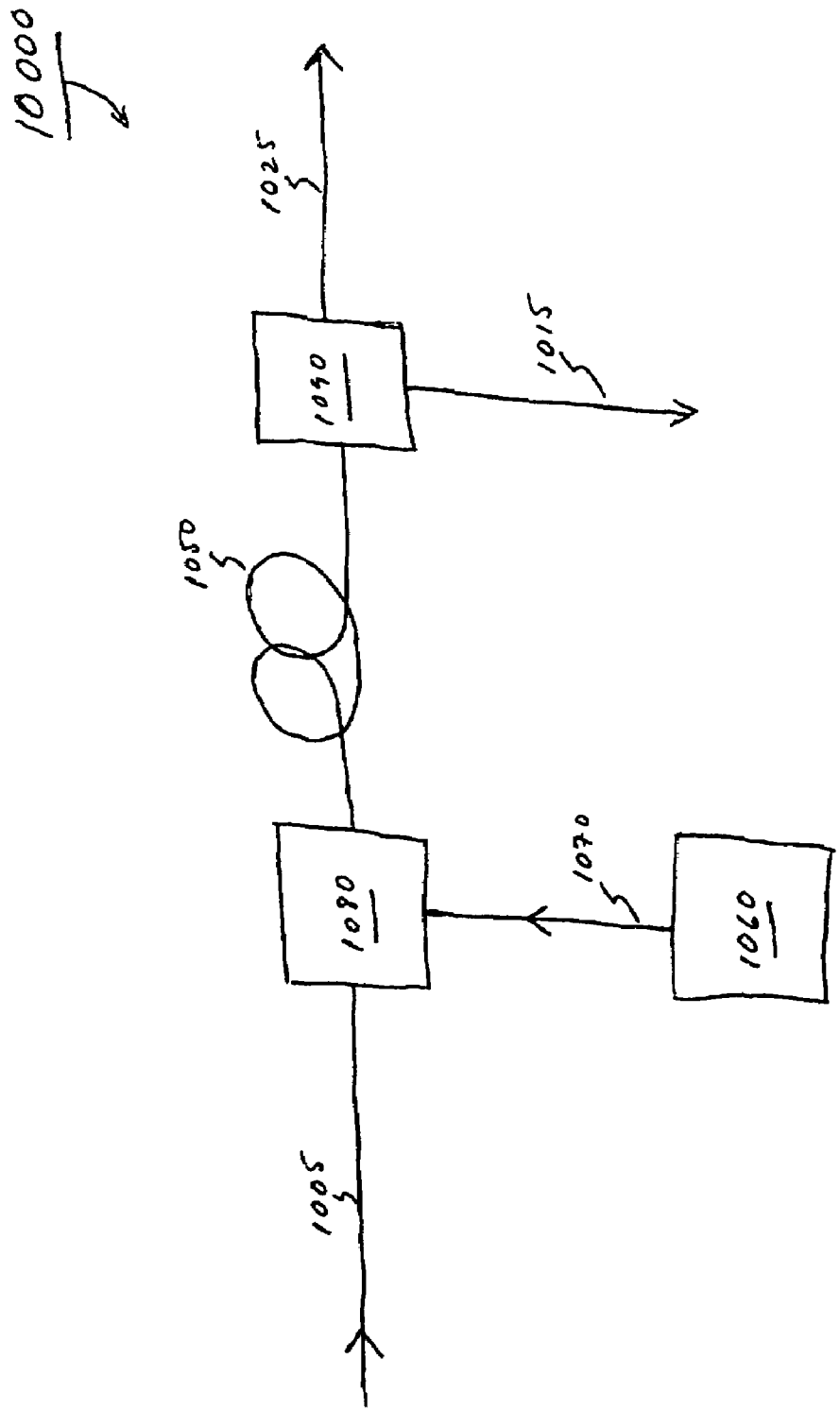
FIG. 11 is a schematic representation of an embodiment of a fiber amplifier system.

Moreover, while the fibers and systems have been described as Raman fiber lasers and Raman fiber laser systems, those skilled in the art will appreciate that the general concepts described can be extended to provide amplifiers and amplifier systems. Generally, a fiber amplifier provides gain for energy at a wavelength or wavelength range of interest without the use of a resonance cavity (e.g., without a resonator) or with an optical cavity operating below resonance threshold. FIG. 11 is a schematic view of an embodiment of a fiber amplifier system 10000 in which a fiber 1050 is used as a signal amplifier. Fiber 1050 can be formed of multiple segments of fiber or a single segment of fiber. To operate at below resonance threshold, for example, one or more of the reflectors can be removed from fiber 1050 and/or the reflectivity of one or more of the reflectors can be reduced. An input signal enters system 10000 via fiber 1005 (the reflectors can be, for example, otherwise arranged as described above). Energy source 1060 emits a pump signal 1070. The input signal in fiber 1005 and pump signal 1070 are coupled into fiber 1050 via coupler 1080. Such couplers are known to those skilled in the art. Pump signal 1070 interacts with the Raman active material(s) in the sections of fiber 1050, and the input signal is amplified. A device 1090 (e.g., a WDM coupler) separates the amplified input signal from the Stokes shifted pump signal so that the Stokes shifted pump signal travels along fiber 1015, and the amplified input signal travels along fiber 1025. While FIG. 13 shows one embodiment of fiber 1050 in a fiber amplifier system, other fiber amplifier systems in which fiber 1050 can be used will be apparent to those of skill in the art.

Figure 12:
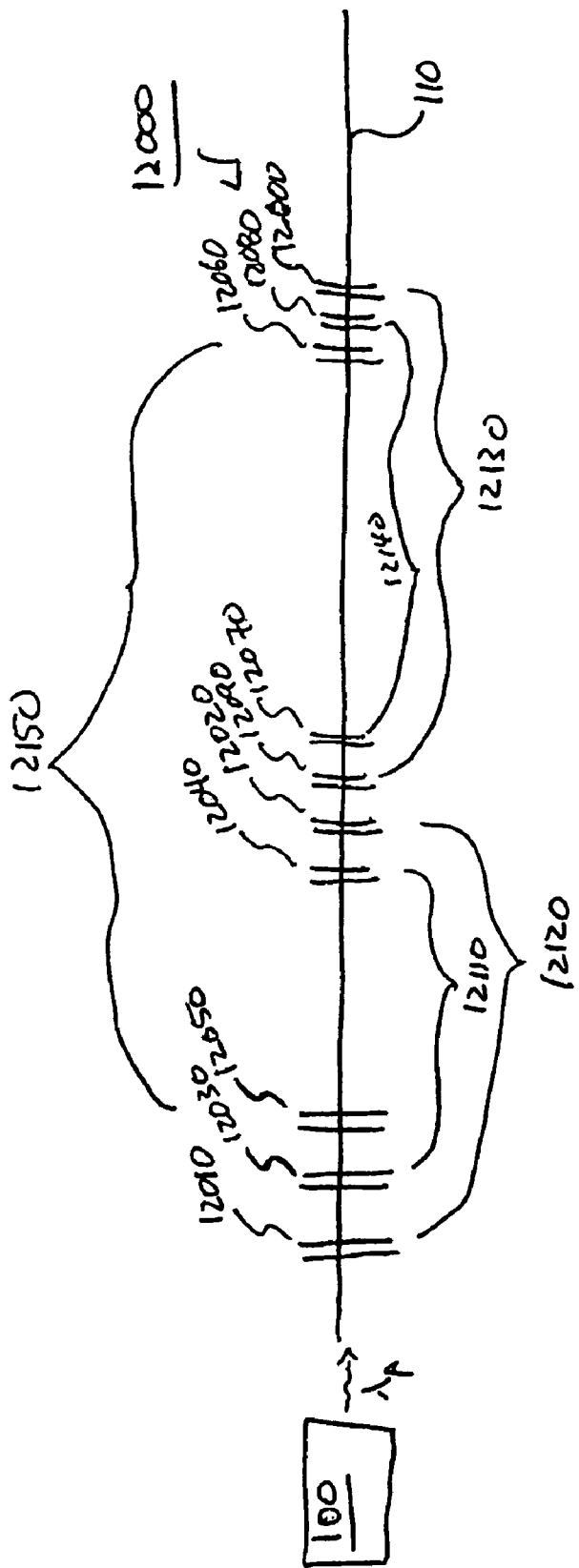
FIG. 12 is a schematic representation of an embodiment of a Raman fiber laser system.

Furthermore, while the foregoing discussion has been with respect to linked resonance cavities, the invention is not so limited. In certain embodiments, the systems can be formed of a hybrid of linked and nested resonance cavities. Nested resonance cavities refer to resonance cavities in which one resonance cavity is entirely contained within another resonance cavity. For example, FIG. 12 shows a system 12000 including an optical fiber 110, a pair of reflectors 12010 and 12020 (which reflect substantially all energy at wavelength $\lambda_1$) a pair of reflectors 12030 and 12040 (which reflect substantially all energy at wavelength $\lambda_{s2}$) a pair of reflectors 12050 and 12060 (which reflect substantially all energy at wavelength $\lambda_{s3}$) a pair of reflectors 12070 and 12080 (which reflect substantially all energy at wavelength $\lambda_{s4}$) and a pair of reflectors 12090 and 12100 (which reflect substantially all energy at wavelength $\lambda_{s5}$) where $\lambda_{sn}$ is determined as described above. With this configuration, reflectors 12030 and 12040 form a resonance cavity 12110 that is nested within a resonance cavity 12120 formed by reflectors 12010 and 12020, and reflectors 12070 and 12080 form a resonance cavity 12140 that is nested within a resonance cavity 12130 formed by reflectors 12090 and 12100. In addition, reflectors 12050 and 12060 form a resonance cavity 12150. Resonance cavity 12150 is linked with resonance cavity 12110, and resonance cavity 12150 is linked with resonance cavity 12120. Resonance cavity 12150 is linked with resonance cavity 12130, and resonance cavity 12150 is linked with resonance cavity 12140.

Other embodiments are in the claims.

The invention claimed is:

1. A system, comprising an optical fiber comprising a gain medium having a Raman active material with a Raman gain spectrum, the optical fiber being configured to receive energy at a wavelength $\lambda_p$; and at least three pairs of reflectors disposed in the optical fiber, each pair of reflectors forming a resonance cavity with a resonance frequency, each resonance cavity having an index, the index of each resonance cavity being different than the index of the other resonance cavities, wherein, for a resonance cavity having an index with a value M, M being an integer having a value of at least one, the resonance cavity has a resonance frequency $(c/\lambda_{sm})$, where $$\lambda_{sm}^{-1} = \lambda_p^{-1} - \Sigma_M \lambda_{rm}^{-1}$$

where $(c/\lambda_{rm})$ is a frequency within the Raman gain spectrum of the Raman active material contained in the gain medium and c is the speed of light, and, for a resonance cavity having an index with a value N, N being an integer having a value of at least two, the resonance cavity has a resonance frequency $(c/\lambda_{sn})$, the resonance cavity having the index with the value N overlapping only with a resonance cavity having a resonance frequency $(c/\lambda_{s(n-1)})$ and with a resonance cavity having a resonance frequency $(c/\lambda_{s(n+1)})$ with the caveat that the resonance cavity having the highest value for N overlaps with at most one other resonance cavity.

2. The system of claim 1, wherein the optical fiber comprises four pairs of reflectors.

3. The system of claim 1, wherein the optical fiber comprises six pairs of reflectors.

4. The system of claim 1, wherein the optical fiber comprises nine pairs of reflectors.

5. The system of claim 1, wherein the optical fiber comprises greater than 10 pairs of reflectors.

6. The system of claim 1, wherein at least one pair of reflectors has a first reflector and a second reflector, the first reflector being disposed in the optical fiber closer to a point where energy at the wavelength $\lambda_p$ enters the optical fiber than the second reflector, the second reflector being configured to reflect only a portion of energy impinging thereon at the resonance frequency for the resonance cavity formed by the at least one pair of reflectors.

7. The system of claim 6, wherein the first reflector is configured to reflect substantially all energy impinging thereon at the resonance frequency for the resonance cavity formed by the at least one pair of reflectors.

8. The system of claim 6, wherein the second reflector is configured to reflect less than 98% of the energy impinging thereon at the resonance frequency for the resonance cavity formed by the at least one pair of reflectors.

9. The system of claim 6, wherein the second reflector is configured to reflect less than 95% of the energy impinging thereon at the resonance frequency for the resonance cavity formed by the at least one pair of reflectors.

10. The system of claim 6, wherein the second reflector is configured to reflect less than 90% of the energy impinging thereon at the resonance frequency for the resonance cavity formed by the at least one pair of reflectors.

11. The system of claim 6, wherein the second reflector is configured to reflect less than 50% of the energy impinging thereon at the resonance frequency for the resonance cavity formed by the at least one pair of reflectors.

12. The system of claim 6, wherein the second reflector is configured to reflect less than 25% of the energy impinging thereon at the resonance frequency for the resonance cavity formed by the at least one pair of reflectors.

13. The system of claim 6, wherein the amount of energy at the resonance frequency for the resonance cavity that the second reflector is capable of reflecting is variable.

14. The system of claim 1, wherein each pair of reflectors has a first reflector and a second reflector, and for each pair of reflectors the first reflector is disposed in the optical fiber closer to a point where energy at the wavelength $\lambda_p$ enters the optical fiber than the second reflector and the second reflector is configured to reflect only a portion of energy impinging thereon at the resonance frequency for the resonance cavity formed by the first and second reflectors.

15. The system of claim 14, wherein the first reflector is configured to reflect substantially all energy impinging thereon at the resonance frequency for the resonance cavity formed by the first and second reflectors.

16. The system of claim 14, wherein the second reflector is configured to reflect less than 98% of the energy impinging thereon at the resonance frequency for the resonance cavity formed by the first and second reflectors.

17. The system of claim 14, wherein the second reflector is configured to reflect less than 95% of the energy impinging thereon at the resonance frequency for the resonance cavity formed by the first and second reflectors.

18. The system of claim 14, wherein the second reflector is configured to reflect less than 90% of the energy impinging thereon at the resonance frequency for the resonance cavity formed by the first and second reflectors.

19. The system of claim 14, wherein the second reflector is configured to reflect less than 50% of the energy impinging thereon at the resonance frequency for the resonance cavity formed by the first and second reflectors.

20. The system of claim 14, wherein the second reflector is configured to reflect less than 25% of the energy impinging thereon at the resonance frequency for the resonance cavity formed by the first and second reflectors.

21. The system of claim 14, wherein the amount of energy at the resonance frequency for the resonance cavity that the second reflector is capable of reflecting is variable.

22. The fiber of claim 1, wherein at least one resonance cavity has a suppressor disposed therein, the suppressor being configured to substantially suppress formation of energy at a frequency $(c/\lambda_x)$ where $$\lambda_x^{-1} = \lambda_z^{-1} - \lambda_a^{-1},$$

$(c/\lambda_z)$ is a resonance frequency of the at least one resonance cavity and $(c/\lambda_a)$ is a frequency in the Raman gain spectrum of the active material in the gain medium in the optical fiber.

23. The system of claim 1, wherein, for each resonance cavity, the resonance cavity has a suppressor disposed therein, the suppressor being configured to substantially suppress formation of energy at a frequency in the Raman gain spectrum of the active material in the gain medium in the optical fiber.

24. The system of claim 1, wherein one pair of reflectors has first and second reflectors, the first and second reflectors being configured to reflect substantially all energy impinging thereon at the resonance frequency of the corresponding resonance cavity.

25. The system of claim 1, wherein the at least three pairs of reflectors includes a first pair of reflectors and a second pair of reflectors, the first pair of reflectors having first and second reflectors, the second pair of reflectors having first and second reflectors, the first and second reflectors of the first pair of reflectors being configured to reflect substantially all energy impinging thereon at the resonance frequency of the resonance cavity formed by first pair of reflectors, and the first and second reflectors of the second pair of reflectors being configured to reflect substantially all energy impinging thereon at the resonance frequency of the resonance cavity formed by the second pair of reflectors.

26. The system of claim 1, wherein the at least three pairs of reflectors includes a first pair of reflectors, a second pair of reflectors and a third pair of reflectors, the first pair of reflectors having first and second reflectors, the second pair of reflectors having first and second reflectors, the third pair of reflectors having first and second reflectors, the first and second reflectors of the first pair of reflectors being configured to reflect substantially all energy impinging thereon at the resonance frequency of the resonance cavity formed by the first pair of reflectors, the first and second reflectors of the second pair of reflectors being configured to reflect substantially all energy impinging thereon at the resonance frequency of the resonance cavity formed by the second pair of reflectors, and the first and second reflectors of the third pair of reflectors being configured to reflect substantially all energy impinging thereon at the resonance frequency of the resonance cavity formed by the third pair of reflectors.

27. The system of claim 1, further comprising an additional reflector disposed in the optical fiber, the additional reflector being configured to at least partially reflect energy impinging thereon at the wavelength $\lambda_p$.

28. The system of claim 1, further comprising an additional reflector disposed in the optical fiber, the additional reflector being configured to reflect substantially all energy impinging thereon at the wavelength $\lambda_p$.

29. The system of claim 1, wherein at least one of the pairs of reflectors comprises a pair of fiber Bragg gratings.

30. The system of claim 1, wherein the Raman active material is selected from the group consisting of $GeO_2$ and $P_2O_5$.

31. The system of claim 1, further comprising:
an energy source configured to emit energy at a wavelength $\lambda_p$; wherein
the optical fiber is configured to receive energy from the energy source at the wavelength $\lambda_p$.

32. The system of claim 31, wherein the energy source comprises a laser.

33. The system of claim 31, wherein the energy source is capable of lasing at the wavelength $\lambda_p$.

34. A system comprising an optical fiber comprising a gain medium having a Raman active material, the optical fiber being configured to receive energy at a wavelength $\lambda_p$; and
at least three pairs of reflectors disposed in the optical fiber, each pair of reflectors forming a corresponding resonance cavity with a conesponding resonance frequency, the resonance frequency of each resonance cavity being different than the resonance frequency of any other cavity,
wherein the optical fiber is substantially devoid of a location that is included in more than two of the resonance cavities.

35. The system of claim 34, wherein the optical fiber comprises four pairs of reflectors.

36. The system of claim 34, wherein the optical fiber comprises six pairs of reflectors.

37. The system of claim 34, wherein the optical fiber comprises eight pairs of reflectors.

38. The system of claim 34, wherein the optical fiber comprises greater than 10 pairs of reflectors.

39. The system of claim 34, wherein at least one pair of reflectors has a first reflector and a second reflector, the first reflector being disposed in the optical fiber closer to a point where energy at the wavelength $\lambda_p$ enters the optical fiber than the second reflector, the second reflector being configured to reflect only a portion of energy impinging thereon at the resonance frequency for the resonance cavity formed by the at least one pair of reflectors.

40. The system of claim 39, wherein the first reflector is configured to reflect substantially all impinging thereon at the resonance frequency for the resonance cavity formed by the at least one pair of reflectors.

41. The system of claim 39, wherein the second reflector is configured to reflect less than 98% of the energy impinging thereon at the resonance frequency for the resonance cavity formed by the at least one pair of reflectors.

42. The system of claim 39, wherein the second reflector is configured to reflect less than 95% of the energy impinging thereon at the resonance frequency for the resonance cavity formed by the at least one pair of reflectors.

43. The system of claim 39, wherein the second reflector is configured to reflect less than 90% of the energy impinging thereon at the resonance frequency for the resonance cavity formed by the at least one pair of reflectors.

44. The system of claim 39, wherein the second reflector is configured to reflect less than 50% of the energy impinging thereon at the resonance frequency for the resonance cavity formed by the at least one pair of reflectors.

45. The system of claim 39, wherein the second reflector is configured to reflect less than 10% of the energy impinging thereon at the resonance frequency for the resonance cavity formed by the at least one pair of reflectors.

46. The system of claim 39, wherein the amount of energy at the resonance frequency for the resonance cavity that the second reflector is capable of reflecting is variable.

47. The system of claim 34, wherein each pair of reflectors has a first reflector and a second reflector, and for each pair of reflectors the first reflector is disposed in the optical fiber closer to a point where energy at the wavelength $\lambda_p$ enters the optical fiber than the second reflector and the second reflector is configured to reflect only a portion of energy impinging thereon at the resonance frequency for the resonance cavity formed by the first and second reflectors.

48. The system of claim 47, wherein the first reflector is configured to reflect substantially all energy impinging thereon at the resonance frequency for the resonance cavity formed by the first and second reflectors.

49. The system of claim 47, wherein the second reflector is configured to reflect less than 98% of the energy impinging thereon at the resonance frequency for the resonance cavity formed by the first and second reflectors.

50. The system of claim 47, wherein the second reflector is configured to reflect less than 95% of the energy impinging thereon at the resonance frequency for the resonance cavity formed by the first and second reflectors.

51. The system of claim 47, wherein the second reflector is configured to reflect less than 90% of the energy impinging thereon at the resonance frequency for the resonance cavity formed by the first and second reflectors.

52. The system of claim 47, wherein the second reflector is configured to reflect less than 60% of the energy impinging thereon at the resonance frequency for the resonance cavity formed by the first and second reflectors.

53. The system of claim 47, wherein the second reflector is configured to reflect less than 25% of the energy impinging thereon at the resonance frequency for the resonance cavity formed by the first and second reflectors.

54. The system of claim 47, wherein the amount of energy at the resonance frequency for the resonance cavity that the second reflector is capable of reflecting is variable.

55. The fiber of claim 34, wherein at least one resonance cavity has a suppressor disposed therein, the suppressor being configured to substantially suppress formation of energy at a frequency $(c/\lambda_x)$ where $$\lambda_x^{-1} = \lambda_z^{-1} - \lambda_a^{-1},$$

$(c/\lambda_z)$ is a resonance frequency of the at least one resonance cavity and $(c/\lambda_a)$ is a frequency in a Raman gain spectrum of the active material in the gain medium in the optical fiber.

56. The system of claim 55, wherein the suppressor comprises one or more long period gratings.

57. The system of claim 34, wherein, for each resonance cavity, the resonance cavity has a suppressor disposed therein, the suppressor being configured to substantially suppress formation of energy at a frequency in the Raman gain spectrum of the active material in the gain medium in the optical fiber.

58. The system of claim 34, wherein one pair of reflectors has first and second reflectors, the first and second reflectors being configured to reflect substantially all energy impinging thereon at the resonance frequency of the resonance cavity formed by the pair of reflectors.

59. The system of claim 34, wherein the at least three pairs of reflectors includes a first pair of reflectors and a second pair of reflectors, the first pair of reflectors having first and second reflectors, the second pair of reflectors having first and second reflectors, the first and second reflectors of the first pair of reflectors being configured to reflect substantially all energy impinging thereon at the resonance frequency of the resonance cavity formed by the first pair of reflectors, and the first and second reflectors of the second pair of reflectors being configured to reflect substantially all energy impinging thereon at the resonance frequency of the resonance cavity formed by the second pair of reflectors.

60. The system of claim 34, wherein the at least three pairs of reflectors includes a first pair of reflectors, a second pair of reflectors and a third pair of reflectors, the first pair of reflectors having first and second reflectors, the second pair of reflectors having first and second reflectors, the third pair of reflectors having first and second reflectors, the first and second reflectors of the first pair of reflectors being configured to reflect substantially all energy impinging thereon at the resonance frequency of the resonance cavity formed by the first pair of reflectors, the first and second reflectors of the second pair of reflectors being configured to reflect substantially all energy impinging thereon at the resonance frequency of the resonance cavity formed by the second pair of reflectors, and the first and second reflectors of the third pair of reflectors being configured to reflect substantially all energy impinging thereon at the resonance frequency of the resonance cavity formed by the third pair of reflectors.

61. The system of claim 34, further comprising an additional reflector disposed in the optical fiber, the additional reflector being configured to at least partially reflect energy impinging thereon at the wavelength $\lambda_p$.

62. The system of claim 34, further comprising an additional reflector disposed in the optical fiber, the additional reflector being configured to reflect substantially all energy impinging thereon at the wavelength $\lambda_p$.

63. The system of claim 34, wherein at least one pair of reflectors comprises a pair of fiber Bragg gratings.

64. The system of claim 34, wherein each pair of reflectors comprises a pair of fiber Bragg gratings.

65. The system of claim 34, wherein the Raman active material is selected from the group consisting of $GeO_2$ and $P_2O_5$.

66. The system of claim 34, further comprising:
an energy source configured to emit energy at a wavelength $\lambda_p$; wherein
the optical fiber is configured so that energy emitted by the energy source at the $\lambda_p$ can be coupled into the optical fiber.

67. The system of claim 66, wherein the energy source comprises a laser.

68. The system of claim 66, wherein the energy source is capable of lasing at the wavelength $\lambda_p$.

69. A system, comprising:
a fiber comprising an optical fiber comprising a plurality of sections including a first section having a gain medium including a first Raman active material and a second section having a gain medium including a second Raman active material, the optical fiber being configured to receive energy at a wavelength $\lambda_p$; and
at least three pairs of reflectors disposed in the optical fiber, each pair of reflectors forming a corresponding resonance cavity with a cofresponding resonance frequency,
wherein the optical fiber is substantially devoid of a location that is included in more than two of the resonance cavities.

70. The system of claim 69, wherein the first section of the optical fiber contains at least a first pair of reflectors and the second section of the optical fiber contains a second pair of reflectors different than the first pair of reflectors.

71. The system of claim 70, wherein the first section of the optical fiber contains a first reflector of a third pair of reflectors different than the first and second pairs of reflectors, and the second section of the optical fiber contains a second reflector of the third pair of reflectors.

72. The system of claim 69, wherein the first Raman active material comprises $P_2O_5$.

73. The system of claim 72, wherein the first section of fiber contains one pair of reflectors.

74. The fiber of claim 73, wherein the pair of reflectors contained in the first section of fiber forms a resonance cavity having a resonance frequency (c/$\lambda_1$), where $$\lambda_1^{-1}=\lambda_p^{-1}-\lambda_a^{-1},$$

and (c/$\lambda_a$) is a frequency in a Raman gain spectrum of the Raman active material in the gain medium of the first section of the optical fiber.

75. The fiber of claim 72, wherein the second Raman active material comprises $GeO_2$.

76. The fiber of claim 75, wherein the second section of fiber contains two pairs of reflectors.

77. The system of claim 76, wherein one of the two pairs of reflectors contained in the second section of the optical fiber forms a resonance cavity having a resonance frequency (c/$\lambda_2$) and one of the two pairs of reflectors contained in the second section of the optical fiber forms a resonance cavity having a resonance frequency (c/$\lambda_{2'}$),
where $$\lambda_2^{-1}=\lambda_p^{-1}-\lambda_b^{-1},$$

$$\lambda_{2'}^{-1}=\lambda_2^{-1}-\lambda_c^{-1},$$

and (c/$\lambda_b$) and (c/$\lambda_c$) is each a frequency in a Raman gain spectrum of the Raman active material in a gain medium of the second section of the optical fiber.

78. The system of claim 77, wherein the first section of the optical fiber contains a first reflector of an additional pair of reflectors, and the second section of the optical fiber contains a second reflector of the additional pair of reflectors.

79. The system of claim 69, wherein the second Raman active material comprises $GeO_2$.

80. The system of claim 79, wherein the second section of fiber contains three pairs of reflectors.

81. The system of claim 79, wherein the first Raman active material comprises $P_2O_5$.

82. The system of claim 81, wherein the first section of the optical fiber contains a first reflector of an additional pair of reflectors, and the second section of the optical fiber contains a second reflector of the additional pair of reflectors.

83. The system of claim 82, wherein the additional pair of reflectors forms a resonance cavity having a resonance frequency (c/$\lambda_1$), where $$\lambda_1^{-1}=\lambda_p^{-1}-\lambda_a^{-1},$$

and (c/$\lambda_a$) is a frequency in a Raman gain spectrum of the Raman active material in the gain medium of the first section of the optical fiber.

84. The system of claim 80, wherein the three pairs of reflectors contained in the second section of fiber each form a resonance cavity having a resonance frequency of (c/$\lambda_2$), (c/$\lambda_{2'}$), (c/$\lambda_{2''}$), respectively, where $$\lambda_2^{-1}=\lambda_1^{-1}-\lambda_b^{-1},$$

$$\lambda_{2'}^{-1}=\lambda_2^{-1}-\lambda_c^{-1},$$

$$\lambda_{2''}^{-1}=\lambda_{2'}^{-1}-\lambda_d^{-1},$$

and (c/$\lambda_b$), (c/$\lambda_c$) and (c/$\lambda_d$) is each a frequency in a Raman gain spectrum of the Raman active material in the gain medium of the second section of the optical fiber.

85. The system of claim 69, further comprising:
an energy source configured to emit energy at a wavelength $\lambda_p$; wherein
the optical fiber is configured so that energy emitted by the energy source at the $\lambda_p$ can be coupled into the optical fiber.

86. The system of claim 85, wherein the energy source comprises a laser.

87. The system of claim 85, wherein the energy source is capable of lasing at the wavelength $\lambda_p$.

88. A fiber, comprising:

an optical fiber containing a plurality of segments; and at least three pairs of reflectors disposed in the optical fiber, each pair of reflectors forming a resonance cavity with a resonance frequency, each resonance cavity having an index, the index of each resonance cavity being different than the index of the other resonance cavities, wherein, for at least one resonance cavity, the at least one resonance cavity overlaps with only two resonance cavities, one of the two resonance cavities having a resonance frequency that is one Raman Stokes shift higher than a resonance frequency of the at least one cavity, and the other of the two resonance cavities having a resonance frequency that is one Raman Stokes shift lower than the resonance frequency of the at least one cavity.

89. The system of claim 1, further comprising:

a splitter configured so that output energy from the fiber can be coupled into the splitter; and a plurality of optical fibers configured so that energy output from the splitter can be coupled into one or more of the plurality of fibers.

90. The system of claim 1, further comprising:

a pump laser; and a fiber laser coupled to the pump laser so that energy output by the pump laser can be coupled into the fiber laser; wherein the fiber is coupled to the fiber laser so that energy output by the fiber laser can be coupled into the fiber.

91. A system, comprising: an optical fiber comprising a gain medium having a Raman active material with a Raman gain spectrum, the optical fiber being configured to receive energy at a wavelength $\lambda_p$; and at least three pairs of reflectors disposed in the optical fiber, each pair of reflectors forming a resonance cavity with a resonance frequency, each resonance cavity having an index, the index of each resonance cavity being different than the index of the other resonance cavities, wherein, for a resonance cavity having an index with a value M, M being an integer having a value of at least one, the resonance cavity has a resonance frequency $(c/\lambda_{sm})$, where $$\lambda_{sm}^{-1} = \lambda_p^{-1} - \Sigma_M \lambda_{rm}^{-1}$$

where $(c/\lambda_{rm})$ is a frequency within the Raman gain spectrum of the Raman active material contained in the gain medium and c is the speed of light, and the reflectors are configured so that at least two resonance cavities do not overlap.

92. The system according to claim 91, further comprising:

an energy source configured to emit energy at a wavelength $\lambda_p$; wherein the optical fiber is configured to receive energy at a wavelength $\lambda_p$.

* * * * *